(12) United States Patent
Iwasa

(10) Patent No.: US 8,861,094 B2
(45) Date of Patent: Oct. 14, 2014

(54) LENS BARREL

(75) Inventor: Kazuyuki Iwasa, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 56 days.

(21) Appl. No.: 13/588,039

(22) Filed: Aug. 17, 2012

(65) Prior Publication Data
US 2013/0057965 A1 Mar. 7, 2013

(30) Foreign Application Priority Data

Sep. 7, 2011 (JP) .................................. 2011-195415

(51) Int. Cl.
| | |
|---|---|
| G02B 15/14 | (2006.01) |
| G03B 17/14 | (2006.01) |
| G03B 3/00 | (2006.01) |
| G03B 17/02 | (2006.01) |
| G02B 7/10 | (2006.01) |

(52) U.S. Cl.
CPC ................ G02B 7/102 (2013.01); G03B 17/14 (2013.01); G03B 3/00 (2013.01); G03B 2205/0046 (2013.01); G03B 17/02 (2013.01)
USPC .......................................... 359/696; 359/694

(58) Field of Classification Search
USPC .................... 359/694–706, 822–826
See application file for complete search history.

(56) References Cited

U.S. PATENT DOCUMENTS 6,038,404 A * 3/2000 Suzuki et al. .................. 396/79

FOREIGN PATENT DOCUMENTS

JP           01-167715           7/1989

* cited by examiner

*Primary Examiner* — Mahidere Sahle
(74) *Attorney, Agent, or Firm* — John C. Pokotylo; Straub & Pokotylo

(57) ABSTRACT

A lens barrel includes a rotational drive source, a lead screw that is provided parallel with an optical axis, and rotates by rotation of the drive source, a lens frame that moves in an optical axis direction, a distance ring that rotates around the optical axis by receiving a manual operation, a guide spur gear that rotates by receiving the rotation of the distance ring, and a nut that is screwed onto the lead screw, wherein when the distance ring is rotated, the nut rotates on the lead screw by being linked with the rotation of the guide spur gear, and moves on the lead screw to press the lens frame in the optical axis direction. When the lead screw rotates by the rotation of the rotational drive source, the nut moves on the lead screw to press the lens frame in the optical axis direction.

15 Claims, 19 Drawing Sheets

LENS BARREL

CROSS REFERENCE TO RELATED APPLICATION

This application claims the benefit of Japanese Application No. 2011-195415 filed in Japan on Sep. 7, 2011, the contents of which are incorporated herein by this reference.

BACKGROUND OF THE INVENTION

1. Field of the Invention

The present invention relates to a lens barrel including a focusing mechanism capable of performing an automatic focusing operation and a manual focusing operation without performing mechanical switching of an automatic focusing mechanism and a manual focusing mechanism.

2. Description of the Related Art

Conventionally, in lens barrels which are applied to photographing apparatuses (cameras) and the like which perform photographing or the like, a lens barrel configured to be usable with an AF operation and an MF operation being properly switched by an automatic focusing (autofocus, hereinafter called AF) mechanism and a manual focusing (manual focus, hereinafter called MF) mechanism being mechanically switched has been put into practice in general.

In the focusing mechanisms in the conventional lens barrels, some of the focusing mechanisms are each configured to perform an AF operation by using, for example, a lead screw provided at a drive shaft of a drive motor and to be able to perform an MF operation by a drive force from a manual operation member by providing a clutch mechanism in a drive force transmitting mechanism which transmits a drive force from the drive motor, and shutting off the transmission of the drive force from the drive motor by the clutch mechanism at the time of the MF operation.

Further, in the lens barrels which perform AF operations by using ultrasound motors, various proposals each about a so-called fulltime AF/MF mechanism which is configured to be able to perform an AF operation and an MF operation without switching by a motor and a differential mechanism are made by, for example, Japanese Patent Application Laid-Open Publication No 1-167715 and the like, and are also generally put into practice.

Incidentally, in photographing apparatuses (cameras), so-called digital cameras and the like which acquire electronic images by using image pickup devices have entered widespread use. In each of the lens barrels which are applied to this kind of cameras and the like, such a focusing mechanism is often used that makes a rotational shaft of a stepping motor a lead screw, and moves a nut which is screwed onto the lead screw in the optical axis direction, thereby advancing and retracting a lens for focusing (focusing lens) in the optical axis direction, in order to realize noise reduction due to adaptation to an imager Af operation and adaptation to moving image photographing.

SUMMARY OF THE INVENTION

A lens barrel of the present invention includes a rotational drive source, a male-screw-shaped member (lead screw) that is provided parallel with an optical axis, and rotates by rotation of the drive source, first frame means (lens frame) that moves in an optical axis direction, second frame means (distance ring) that rotates around the optical axis by receiving a manual operation, a first rotational member (guide spur gear) that rotates by receiving the rotation of the second frame means, and a second rotational member (nut) that is screwed onto the male-screw-shaped member, wherein when the second frame means is rotated, the second rotational member rotates on the male-screw-shaped member by being linked with the rotation of the first rotational member, and moves on the male-screw-shaped member to press the first frame means in the optical axis direction. When the male-screw-shaped member rotates by the rotation of the rotational drive source, the second rotational member moves on the male-screw-shaped member to press the first frame means in the optical axis direction.

The advantage of the invention will become more apparent from the following detailed description.

DETAILED DESCRIPTION OF THE PREFERRED EMBODIMENTS

First Embodiment

A first embodiment of the present invention shows a lens barrel which is applied to a camera or the like (hereinafter, simply called a camera) which is a photographing apparatus that performs photographing or the like, and includes a photographing optical system for forming a subject image, by citing the lens barrel as an example.

In each of the drawings which are used in the following description, each of components may be shown with the scale being made different at each of the components in order to make each of the components have such a size that makes each of the components recognizable on the drawings. Accordingly, in the present invention, the numbers and amounts of the components shown in these drawings, the shapes of the components, the ratios of the sizes of the components and relative positional relationships of the respective components are not limited only to the illustrated modes.

Figure 1:
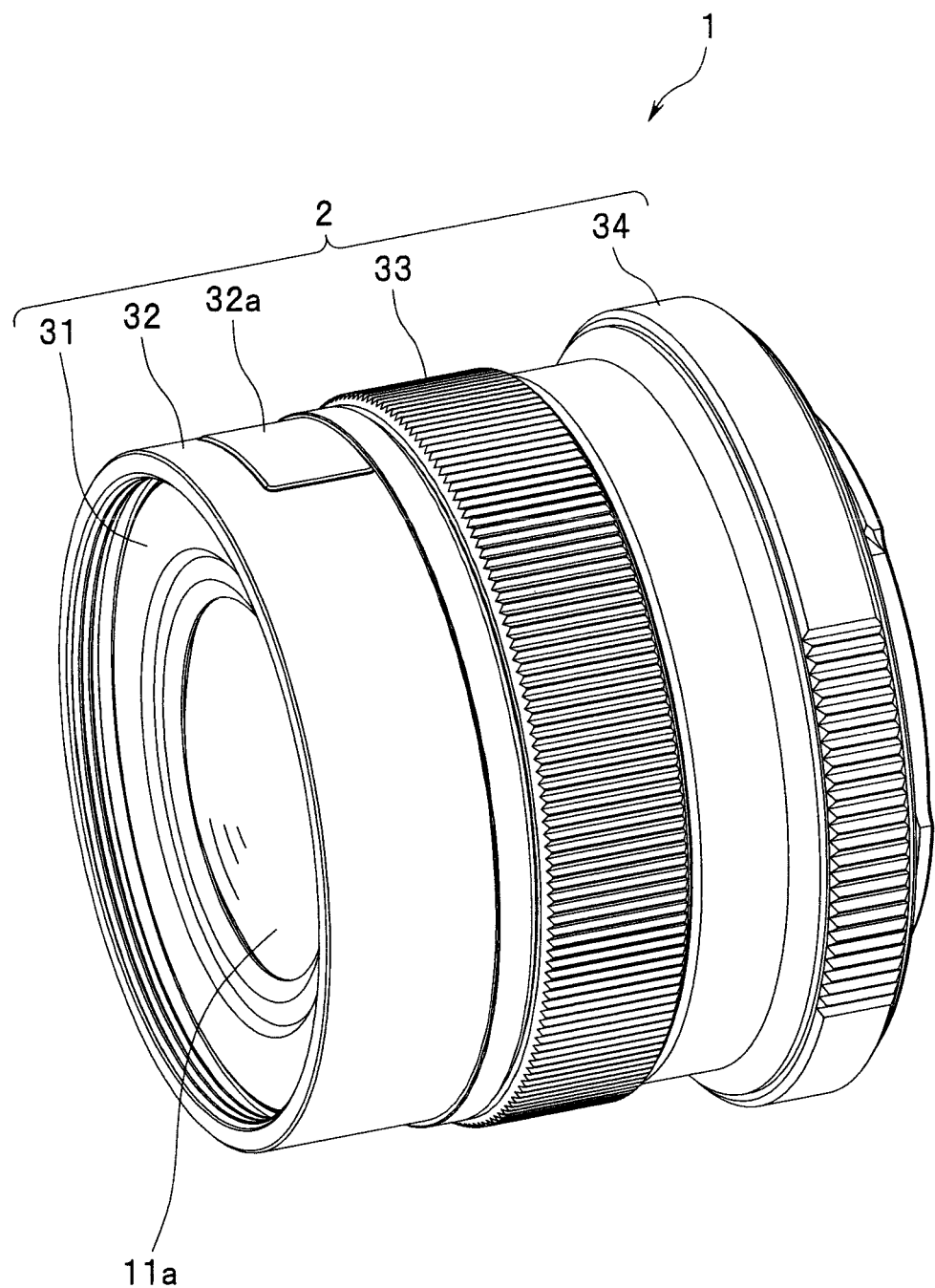
FIG. 1 is an external perspective view showing an entire image of a lens barrel of a first embodiment of the present invention.
Figure 2:
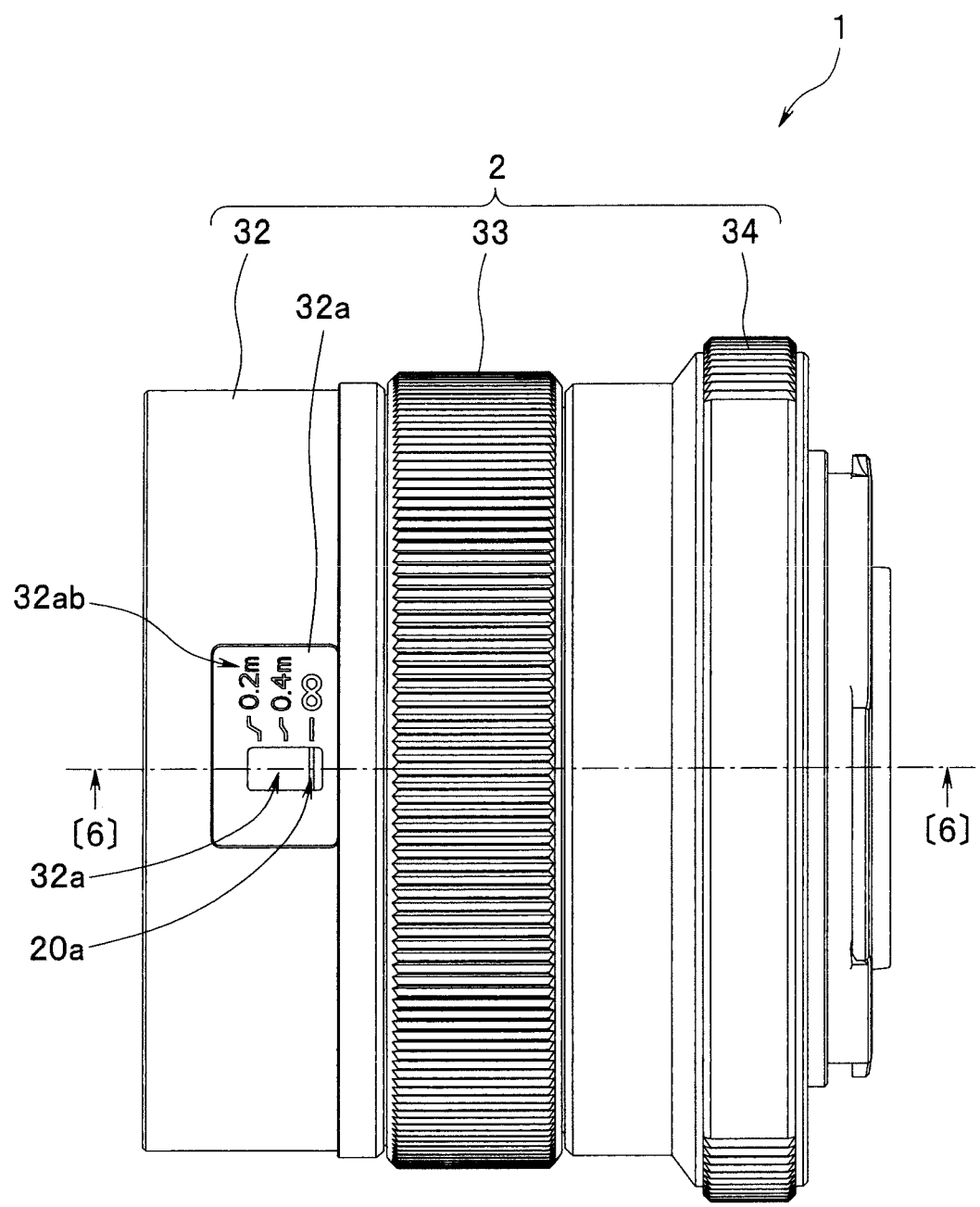
FIG. 2 is a plan view of the lens barrel of FIG. 1.
Figure 3:
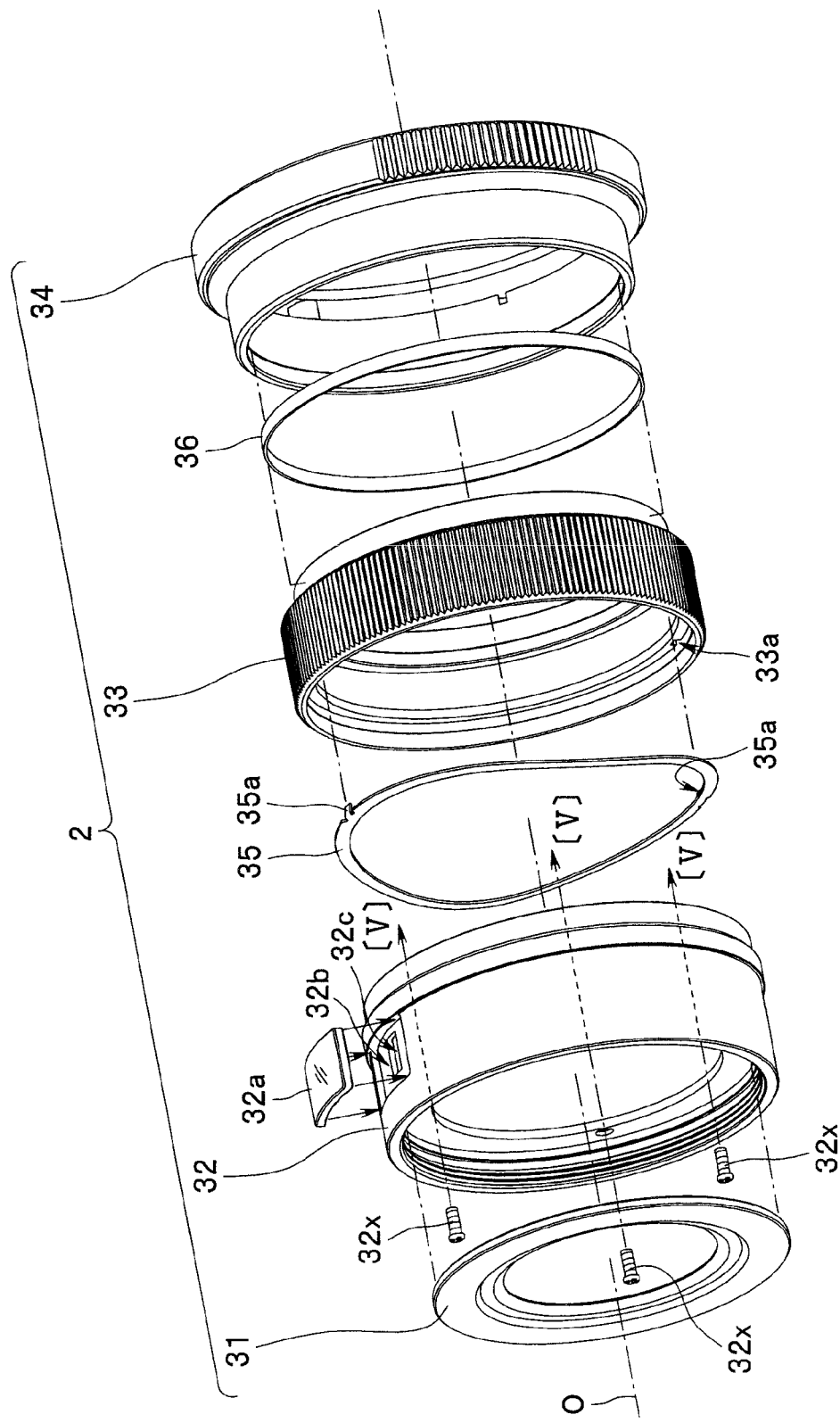
FIG. 3 is an essential part exploded perspective view mainly showing exterior components by extracting the exterior components out of component members of the lens barrel of FIG. 1.
Figure 4:
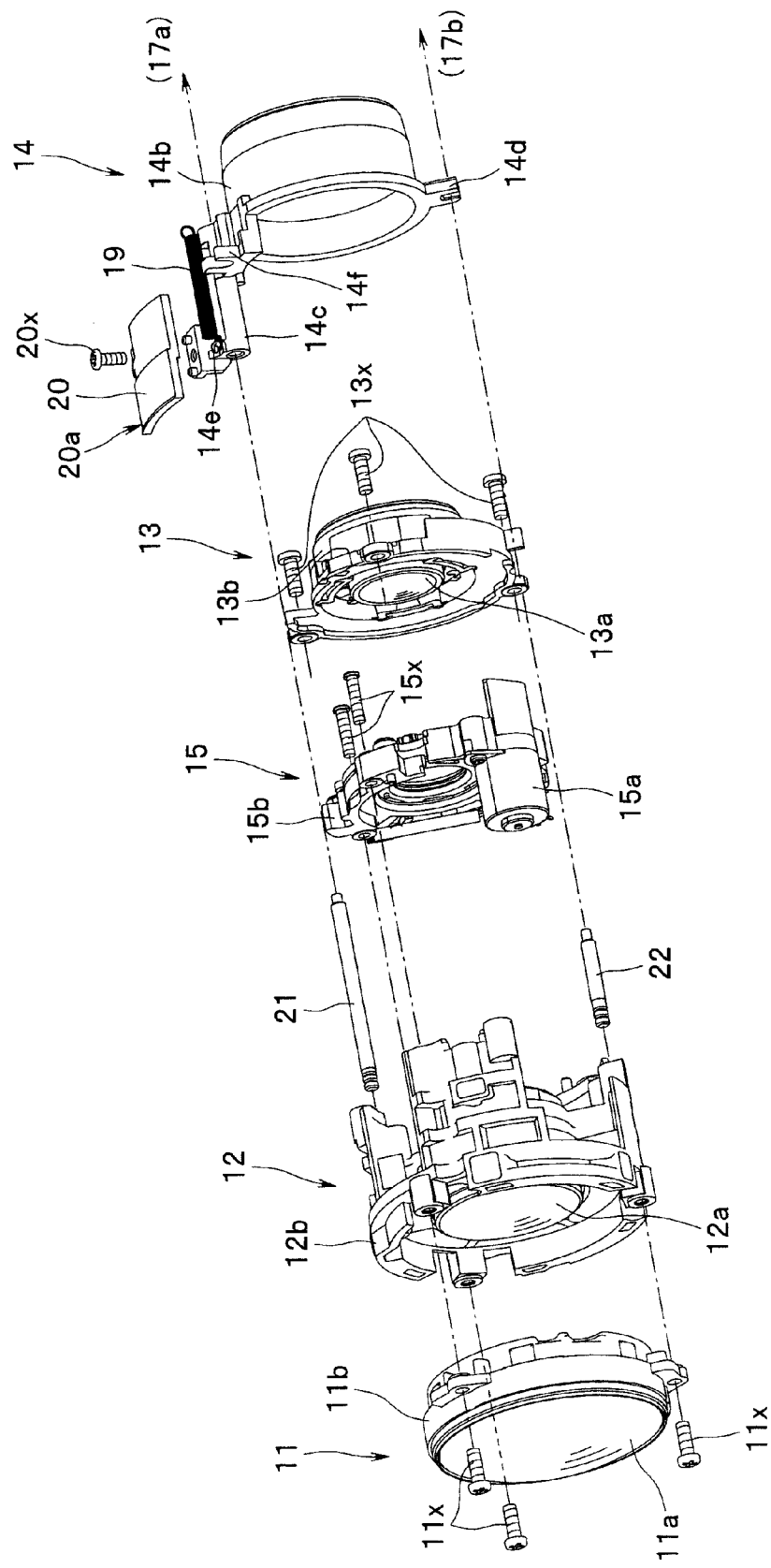
FIG. 4 is an essential part exploded perspective view mainly showing a plurality of lens frames by extracting the plurality of lens frames out of the component members of the lens barrel of FIG. 1.
Figure 5:
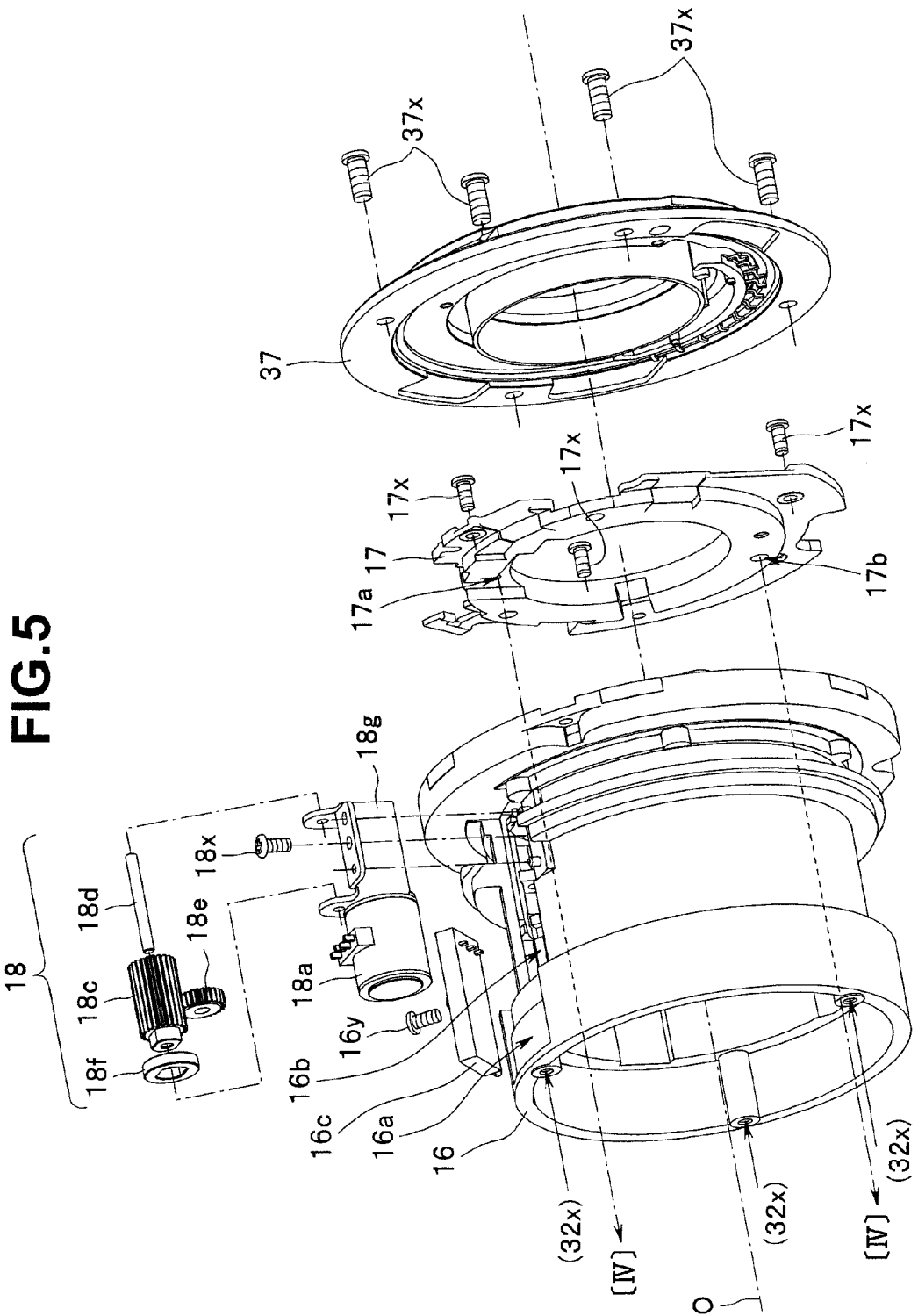
FIG. 5 is an essential part exploded perspective view mainly showing a fixed frame and a focusing mechanism by extracting the fixed frame and the focusing mechanism out of the component members of the lens barrel of FIG. 1.

FIGS. 1 to 13 are views showing the lens barrel of the first embodiment of the present invention. Among the drawings, FIG. 1 is an external perspective view showing an entire image of the lens barrel of the present embodiment, FIG. 2 is a plan view of the same lens barrel. FIGS. 3 to 5 are essential part exploded perspective views each showing the lens barrel of the present embodiment by exploding the lens barrel. Among the drawings, FIG. 3 mainly extracts and shows exterior components out of component members of the present lens barrel. FIG. 4 mainly extracts and shows a plurality of lens frames out of the component members of the present lens barrel. FIG. 5 mainly extracts and shows a fixed frame and a focus mechanism out of the component members of the present lens barrel.

Figure 6:
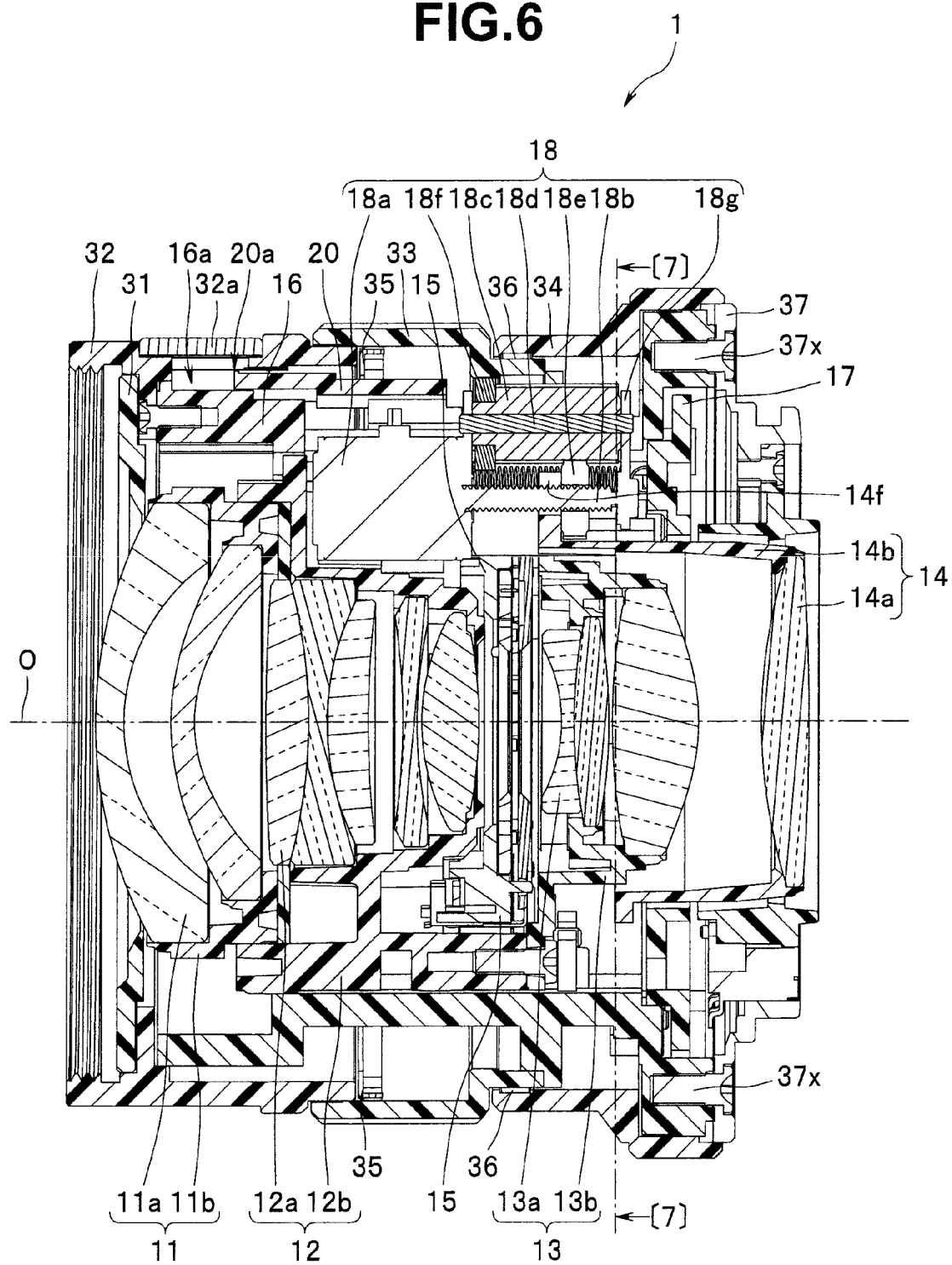
FIG. 6 is a general sectional view showing the focusing mechanism in the lens barrel of FIG. 1.
Figure 7:
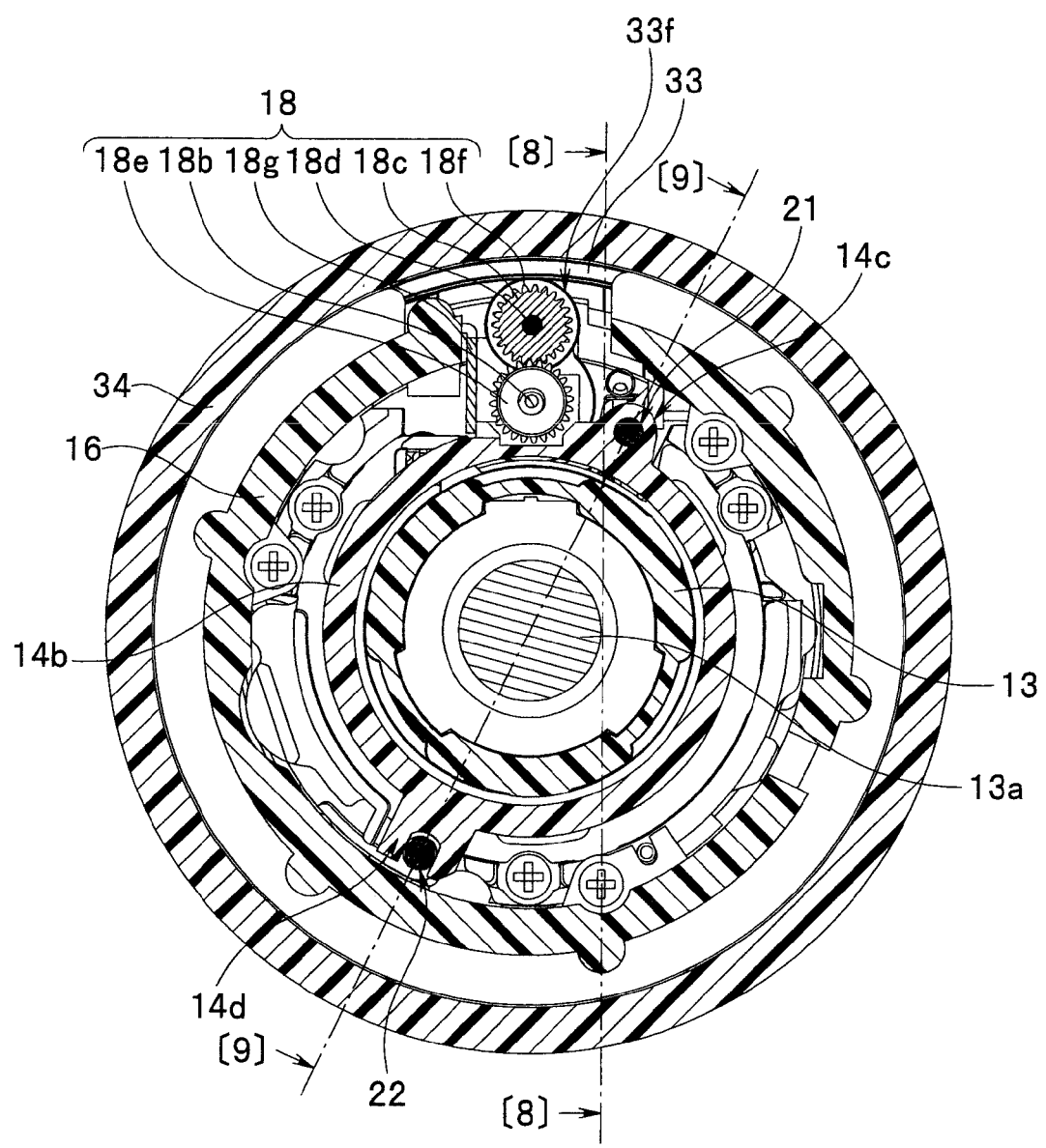
FIG. 7 is a sectional view taken along the line [7]-[7] of FIG. 6.
Figure 8:
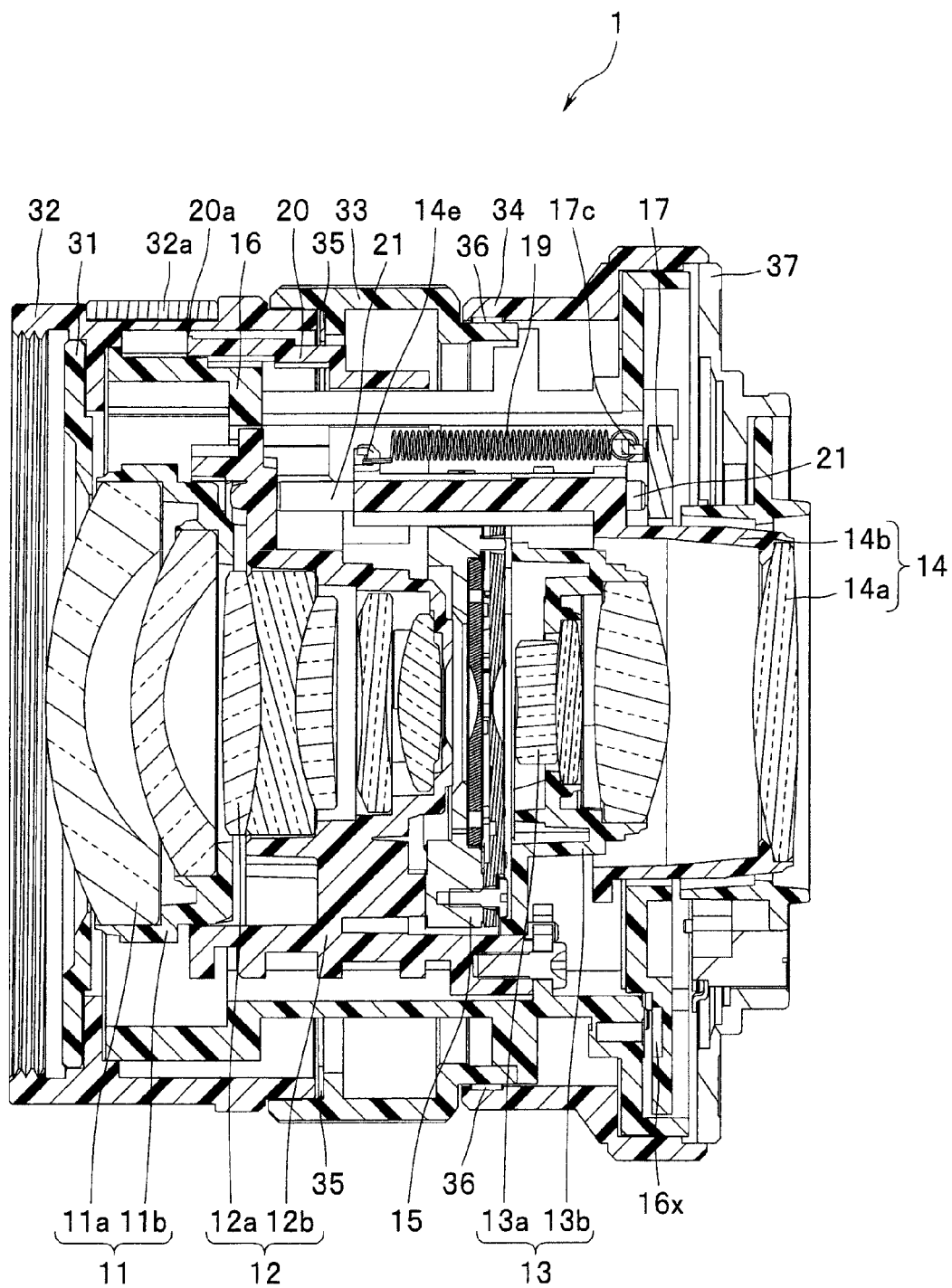
FIG. 8 is a sectional view taken along the line [8]-[8] of FIG. 7.
Figure 9:
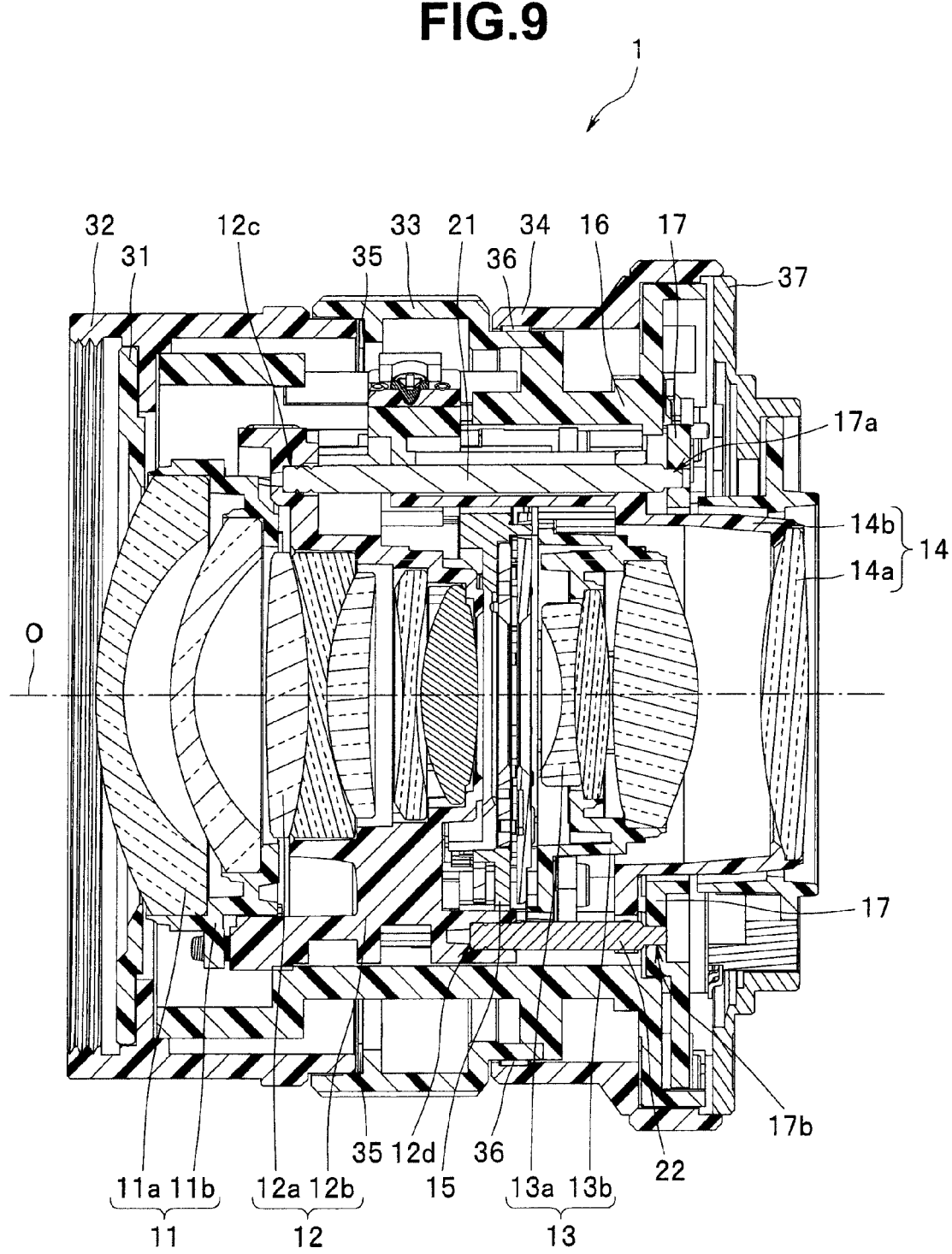
FIG. 9 is a sectional view taken along the line [9]-[9] of FIG. 7.

FIGS. 6 to 9 are sectional views of the present lens barrel. Among the drawings, FIG. 6 is a general sectional view showing the focusing mechanism in the present lens barrel. FIG. 7 is a sectional view taken along the [7]-[7] line of FIG. 6 FIG. 8 is a sectional view taken along the [8]-[8] line of FIG. 7. FIG. 9 is a sectional view taken along the [9]-[9] of FIG. 7.

Figure 10:
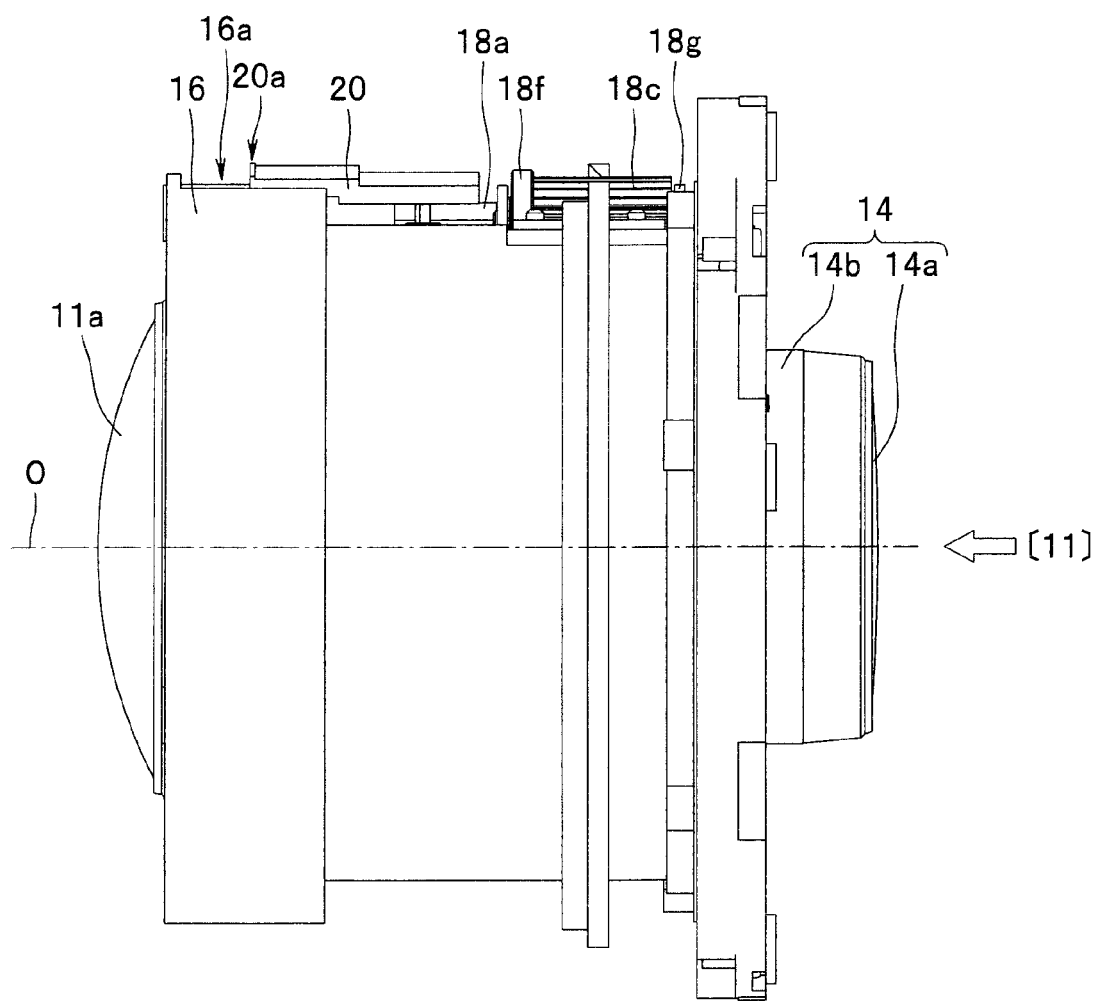
FIG. 10 is a plan view showing disposition of the focusing mechanism with the exterior components of the lens barrel of FIG. 1 being removed, and seen from the arrow [10] direction of FIG. 11.
Figure 11:
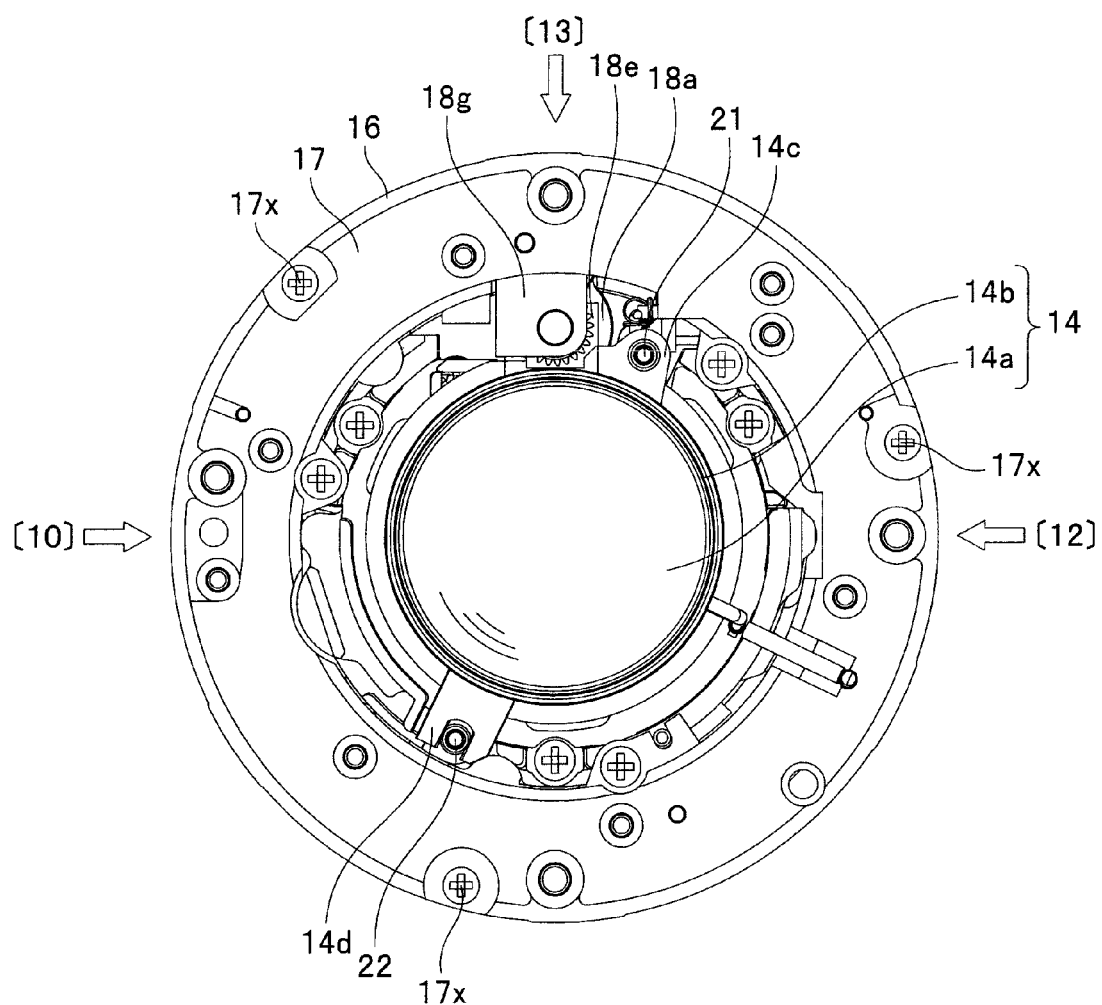
FIG. 11 is a plan view seen from the arrow [11] direction of FIG. 10.
Figure 12:
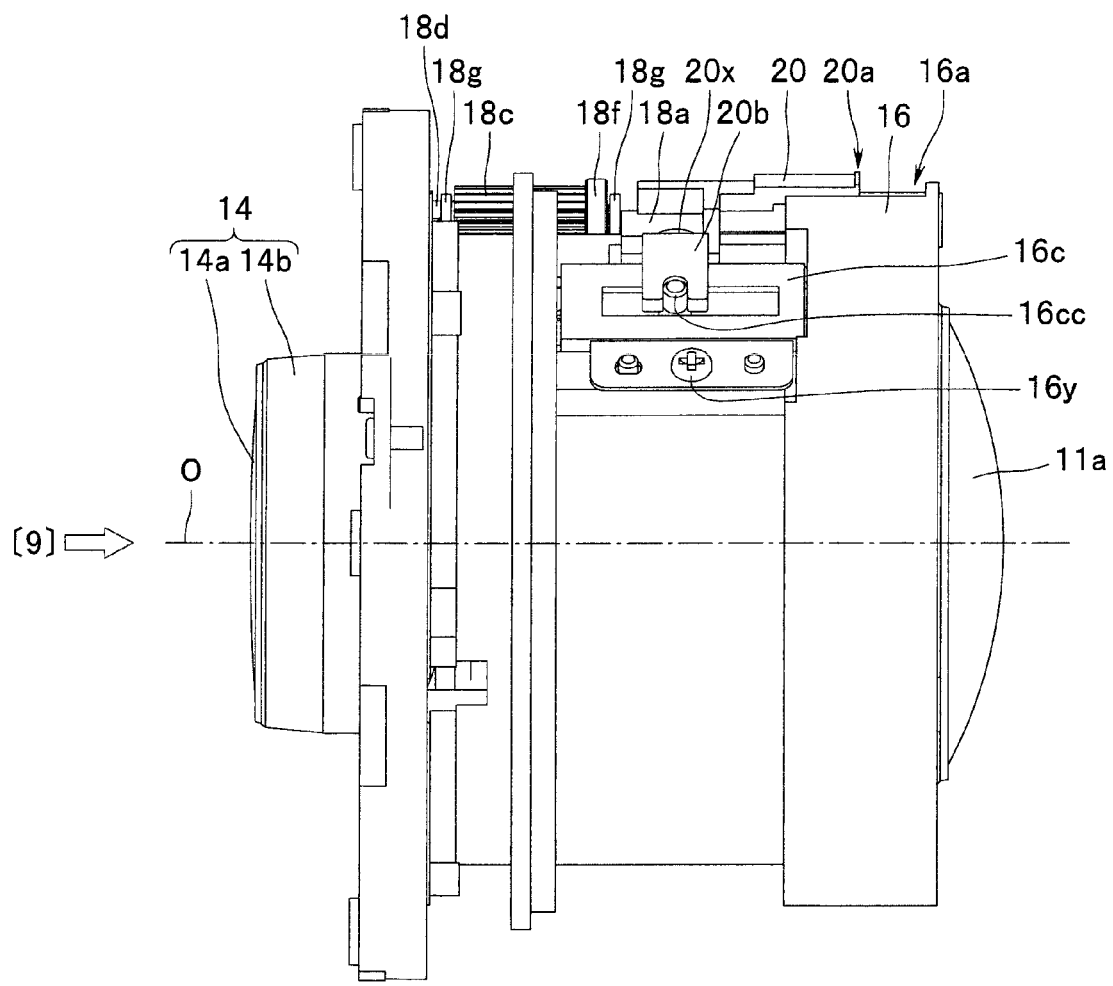
FIG. 12 is a plan view seen from the arrow [12] direction of FIG. 11.
Figure 13:
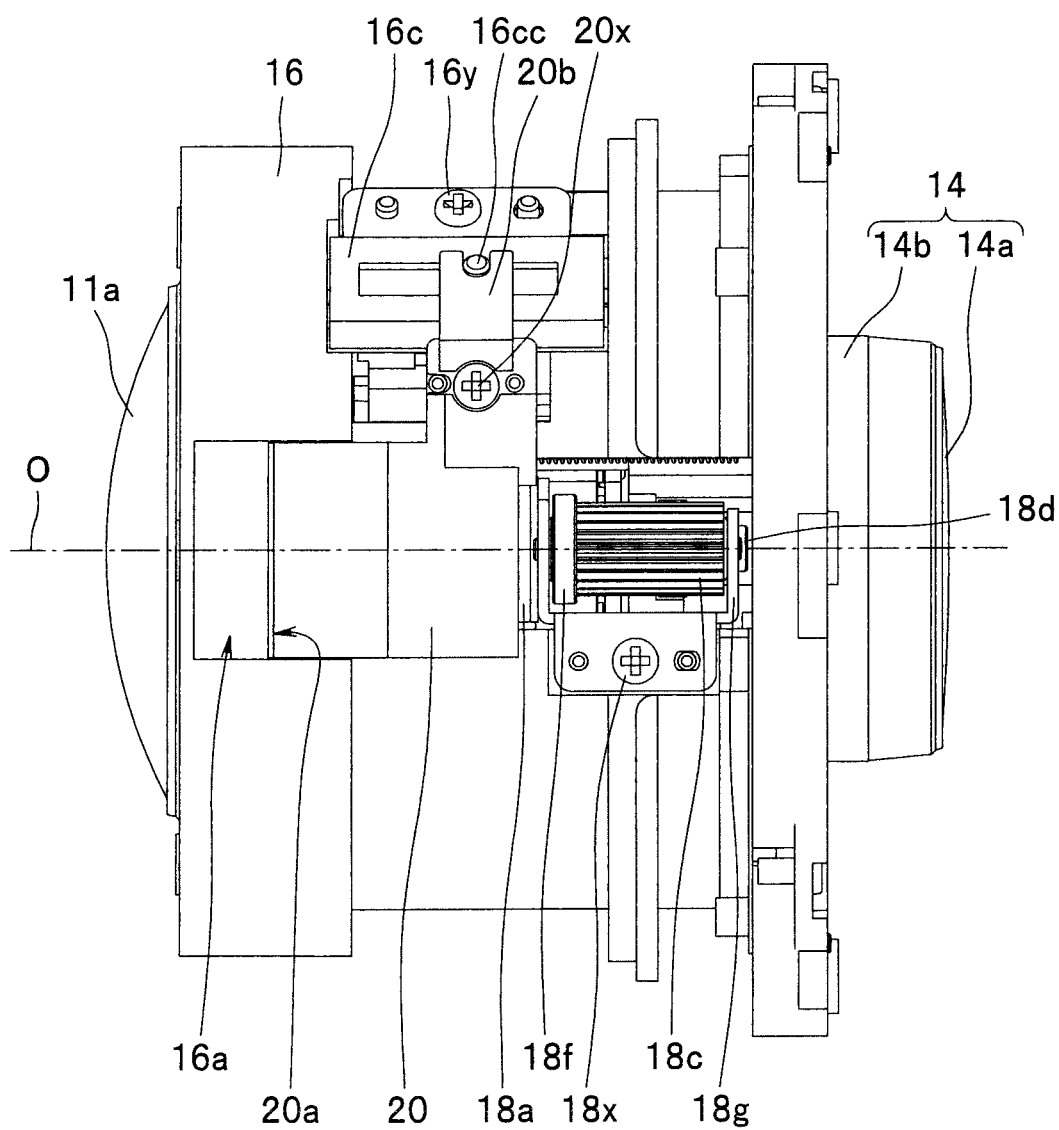
FIG. 13 is a plan view seen from the arrow [13] direction of FIG. 11.

FIGS. 10 to 13 are plan views each showing disposition of the focusing mechanism by removing the exterior components of the present lens barrel. Among the drawings, FIG. 10 is a plan view seen from the arrow [10] direction of FIG. 11. FIG. 11 is a plan view seen from the arrow [11] direction of FIG. 10. FIG. 12 is a plan view seen from the arrow [12] direction of FIG. 11 FIG. 13 is a plan view seen from the arrow [13] direction of FIG. 11.

An exterior component 2 of a lens barrel 1 of the present embodiment is configured by a front decorative ring 31, a filter ring 32, a distance ring 33, a rear cover 34 and the like in sequence from a distal end side as mainly shown in FIGS. 1 to 3.

The filter ring 32 includes a member in a substantially cylindrical shape which mainly covers a region in a vicinity of a distal end portion of an outer circumferential face of the lens barrel 1, and a female screw for a filter for mounting an accessory such as a filter is formed at a distal end region. Further, on an outer circumferential face of the filter ring 32, a recessed portion 32b in a substantially rectangular shape (see FIG. 3) is formed. A hole 32c is provided on a bottom surface of the recessed portion 32b. A distance window 32a which is formed of a transparent resin member is fitted and disposed into the recessed portion 32b in such a manner as to cover the hole 32c. Here, the distance window 32a is bonded and fixed to the recessed portion 32b of the filter ring 32 with, for example, an adhesion member such as a double-sided adhesive tape. A distance display 32ab (see FIG. 2) is provided in the vicinity of the above described distance window 32a by means of printing, seal attaching or the like, on the outer circumferential face of the filter ring 32.

The filter ring 32 is fixed to a front surface of a fixed frame 16 which will be described later by a screw 32x (connected to reference sign (32x) of FIG. 5 from reference sign [V] of FIG. 3).

Though the details will be described later, an index line 20a of a distance index plate 20 which are placed integrally with a group 4 frame unit 14 (will be described later) which is placed in an inside of the lens barrel 1 is exposed from the distance window 32a, whereby distance display is performed.

The above described front decorative ring 31 is a thin plate member in a substantially circular ring shape which is provided to hide internal structures by covering a region near a front surface side outer periphery of the above described filter ring 32 and ensure an optical path by exposing a first lens group 11a which is placed in a vicinity of a substantially central portion. The front decorative ring 31 is bonded and fixed to a flange portion near to the front surface outer periphery of the above described filter ring 32 with an adhesion member such as a double-sided adhesive tape, for example.

The distance ring 33 includes a member in a substantially cylindrical shape which mainly covers an intermediate region in a lengthwise direction of the lens barrel, of the outer circumferential face of the lens barrel 1, and functions as an operation member at the time of performing a manual focusing operation in cooperation with a focusing mechanism 18 which will be described later. Consequently, the distance ring 33 is placed rotatably around an optical axis O. More specifically, the distance ring 33 is second frame means which rotates around the optical axis O relatively to fixed members such as a lens side mount unit 37, a fixed frame 16, the filter ring 32, the rear cover 34 and the like by receiving a manual operation of a user.

In this case, in an inner circumferential portion near a distal end of the distance ring 33, a distance ring spring 35, which includes a plate spring member in a thin plate shape formed in a circular ring shape, with an urging force acting in the optical axis direction, is placed. At the distance ring spring 35, a plurality of folded tab portions 35a (see FIG. 3) are formed. The folded tab portion 35a is prevented from rotating with respect to the distance ring 33 by being engaged with an engaged portion 33a (see FIG. 3) of the distance ring 33.

In a state in which the lens barrel 1 is assembled, the distance ring spring 35 is placed in a state in which the distance ring spring 35 is held between a front end surface of the distance ring 33 and a rear end surface of the above described filter ring 32. By the configuration, the distance ring 33 is pressed toward a rear side by the distance ring spring 35. Accordingly, when the distance ring 33 rotates, a friction in a rotational direction occurs by the above described distance ring spring 35 between the distance ring 33 and the above described filter ring 32. By the frictional force, the distance ring 33 is restrained from easily rotating with a small force while the rotation of the distance ring 33 is ensured.

The rear cover 34 includes a member in a substantially cylindrical shape which mainly covers a region in a vicinity of a rear end portion of the outer circumferential face of the present lens barrel 1, and is fixed to the fixed frame 16 which will be described later. A rear end portion of the above described distance ring 33 is disposed to be engaged with a distal end inner side of the rear cover 34 In this case, a dustproof sheet 36 (see FIGS. 3, 6, and the like) is placed in a state in which the dustproof sheet 36 is tightly held between a distal end inner surface of the rear cover 34 and a rear end outer circumferential face of the distance ring 33. The dustproof sheet 36 is a sheet member in a circular ring shape which is provided to restrain fine dust and the like from entering the inside of the present lens barrel 1 from a gap between the distance ring 33 and the rear cover 34.

Internal component members of the lens barrel 1 of the present embodiment are configured by a fixed frame unit and the like configured by including a group 1 frame unit 11, a group 2 frame unit 12, a diaphragm unit 15, a group 3 frame unit 13, the group 4 frame unit 14 (thus far, see FIG. 4), the fixed frame 16, the focusing mechanism 18, a fixed lid 17, the lens side mount unit 37 (thus far, see FIG. 5), as mainly shown in FIGS. 4 to 9 and the like.

The group 1 frame unit 11 is a unit configured by the first lens group 11a, and a first group frame 11b which holds the first lens group 11a. The first group frame 11b is formed into a substantially circular ring shape, and in a substantially central portion, the above described first lens group 11a is fixed and held. The first group frame 11b is fixed and held at a front surface side of a second group frame 12b which will be described later by a plurality of screws 11x.

The group 2 frame unit 12 is a unit configured by a second lens group 12a, and the second group frame 12b which holds the second lens group 12a. The second group frame 12b is formed into a substantially cylindrical hollow shape, and in a substantially central portion, the above described second lens group 12a is fixed and held. Further, in an inside of the second group frame 12b, the diaphragm unit 15 which will be described later, the group 3 frame unit 13 and the like are fixed and held. Furthermore, the group 4 frame unit 14 is placed to freely advance and retract in a direction along the optical axis O in a space between the diaphragm unit 15 and the group 3 frame unit 13 and the like, inside the above described group 2 frame unit 12. The first group frame 11b is fixed to and held at a front surface of the second group frame 12b, as described above.

In an inner space of the second group frame 12b, a hanger shaft 21 (see FIGS. 4, 7 and 9) is placed to extend toward a rear side parallel with the optical axis O. One end of the hanger shaft 21 is pivotally supported in a predetermined region 12c at a front inner wall surface of the second group frame 12b, and the other end is pivotally supported in a predetermined region 17a of the above described fixed lid 17 (the details will be described later), as shown in FIG. 9. The hanger shaft 21 is fitted in a through-hole of a guide portion 14c of the group 4 frame unit 14 to be relatively slidable. Thereby, the group 4 frame unit 14 is configured to be guided to be able to freely advance and retract in the direction along the optical axis O by the hanger shaft 21 (see FIG. 4 and the like). More specifically, the hanger shaft 21 is a guide shaft which rectilinearly guides the group 4 frame unit 14 (first frame means, will be described later) parallel with the optical axis O.

Further, in order to prevent the group 4 frame unit 14 from rotating with the hanger shaft 21 as a center of rotation, a rotation restricting shaft 22 is placed parallel with the hanger shaft 21, at a region opposed to the hanger shaft 21 with the optical axis O therebetween. More specifically, the rotation restricting shaft 22 has one end pivotally supported in a predetermined region 12d of the front inner wall surface of the second group frame 12b, and the other end pivotally supported in a predetermined region 17b of the above described fixed lid 17, substantially similarly to the above described hanger shaft 21. Here, the predetermined region 12d of the front inner wall surface of the second group frame 12b is the region rotated by approximately 180 degrees around the optical axis O with respect to the predetermined region 12c of the front inner wall surface of the second group frame 12b. Further, the predetermined region 17b of the above described fixed lid 17 is the region rotated by approximately 180 degrees around the optical axis O with respect to the predetermined region 17a of the above described fixed lid 17. The rotation restricting shaft 22 is engaged in a groove portion of a bearing portion 14d of the group 4 frame unit 14. Thereby, when the group 4 frame unit 14 is advanced and retracted by being guided in the direction along the optical axis O by the above described hanger shaft 21, the bearing portion 14d moves along the rotation restricting shaft 22. Thereby, the group 4 frame unit 14 is smoothly movable only in the direction along the optical axis O.

The above described group 4 frame unit 14 is first frame means which holds a fourth lens group 14a which is a lens for focusing (focusing lens) More specifically, the group 4 frame unit 14 is a unit which is configured by the fourth lens group 14a, and a fourth group frame 14b which holds the fourth lens group 14a. The fourth group frame 14b is formed into a substantially cylindrical hollow shape, and in a substantially central portion rear end, the above described fourth lens group 14a is fixed and held. Further, on an outer circumferential face of the fourth group frame 14b, the above described guide portion 14c and the above described bearing portion 14d are projectingly provided at predetermined regions respectively. As described above, the above described hanger shaft 21 is slidably fitted in the guide portion 14c, and the rotation restricting shaft 22 is slidably fitted in the bearing portion 14d, respectively.

Meanwhile, at the guide portion 14c, a spring hook portion 14e (see FIG. 8) is formed. One end of an urging member 19 (see FIGS. 4 and 8) which is spring means including, for example, a coil spring or the like with tautness is hooked on the spring hook portion 14e. Further, the other end of the urging member 19 is hooked on a spring hook portion 17c of the fixed lid 17. Accordingly, the group 4 frame unit 14 is always pulled in the direction of the fixed lid 17 by an urging force of the urging member 19.

Further, the distance index plate 20 is integrally placed at the guide portion 14c by a screw 20x and the like (see FIG. 4). The index line 20a is formed at a distal end edge portion of the distance index plate 20, and as described above, the index line 20a can be observed via the above described distance window 32a. Accordingly, when the group 4 frame unit 14 moves in the direction along the optical axis O with a focusing operation which will be described later, the distance index plate 20 also moves in the same direction at the same time. The configuration is such that as the distance index plate 20 moves, the index line 20a also moves in the predetermined direction, and therefore, the position on the optical axis O of the fourth lens group 14a which is a lens for focusing can be identified in accordance with the position of the index line 20a.

The diaphragm unit 15 is a unit which is configured by diaphragm blades, a diaphragm motor 15a which drives the diaphragm blades, a diaphragm unit frame member 15b which holds the component members and the like. The diaphragm unit frame member 15b is formed in a substantially circular ring shape. The diaphragm unit frame member 15b is fixed to and held in an inside of the above described group 2 frame unit 12 with respect to the above described group 2 frame unit 12, by a plurality of screws 15x.

The group 3 frame unit 13 is a unit which is configured by a third lens group 13a, and a third group frame 13b which holds the third lens group 13a. The third group frame 13b is formed into a substantially cylindrical hollow shape, and in a substantially central portion, the above described third lens group 13a is fixed and held. The third group frame 13b is fixed and held in an inside of the above described group 2 frame unit 12 with respect to the above described group 2 frame unit 12 with the above described diaphragm unit 15 therebetween by a plurality of screws 13x.

Among the fixed frame units, the fixed frame 16 is a frame member in which a distal end region and a rear end region are formed to be large in diameter, and a whole of the fixed frame 16 is formed into a substantially cylindrical shape. In an inner space of the fixed frame 16, the above described group 1 frame unit 11, the above described group 2 frame unit 12, the above described diaphragm unit 15, the above described group 3 frame unit 13 and the above described group 4 frame unit 14 are housed in an assembled state.

On the front surface of the fixed frame 16, the above described filter ring 32 is fixed and held on the front surface of the fixed frame 16 by a plurality of screws 32x as described above (connected to the reference sign [V] of FIG. 3 from the reference sign (32x) of FIG. 5).

A concave portion 16a (see FIG. 5) is formed on an outer circumferential face at the above described distal end large diameter region of the fixed frame 16. A front half portion of the above described distance index plate 20 is fitted and disposed in the concave portion 16a to be movable in the optical axis O direction.

Further, the focusing mechanism 18 is fixed to and placed in a hole portion 16b which is provided by being bored in a predetermined region of a small diameter portion between the above described distal end large diameter region and rear end large diameter region, which is a part of the outer circumferential face of the fixed frame 16. A detailed configuration of the focusing mechanism 18 will be described later.

Furthermore, on the outer circumferential face of the fixed frame 16, a linear encoder 16c which configures a part of fourth frame position detecting means is fixed to and placed at a position adjacent to a vicinity of the above described focusing mechanism 18 by a screw 16y and the like.

The fixed lid 17 in a substantially circular ring shape is fixed to a region near a rear end of the fixed frame 16 by a plurality of screws 17x. A diameter of the fixed lid 17 is formed to be smaller than the rear end large diameter region of the above described fixed frame 16. Accordingly, the fixed lid 17 is fixed to a fixing portion of the fixed frame 16, in a region in a vicinity of an inner side of the rear end large diameter region of the fixed frame 16.

Further, on a rear end surface of the fixed frame 16, the lens side mount unit 37 which has a diameter substantially the same as the diameter of a rear end large diameter region of the fixed lid 17 and is formed in a substantially circular ring shape is fixed to the rear end surface of the above described fixed frame 16 by a plurality of screws 37x in such a manner as to cover the above described fixed lid 17.

Next, the focusing mechanism 18 in the lens barrel 1 of the present embodiment will be described in detail hereinafter with use of FIGS. 10 to 13 in addition to FIGS. 5 to 9.

The above described focusing mechanism 18 is provided at the fixed frame 16 which is the fixed member, and is mainly configured by a drive motor 18a which is a rotational drive source, a lead screw 18b which is a male-screw-shaped member, a long gear 18c which is a first rotational member, a long gear support shaft 18d, a focus nut 18e which is a second rotational member and is also a rotational member, a roller member 18f which is a rolling member, a base metal part 18g and the like.

The drive motor 18a is a rotational drive source for performing an automatic focusing operation, and, for example, an electromagnetic motor such as a stepping motor is applied. The lead screw 18b is integrally formed at a rotational drive shaft of the drive motor 18a The lead screw 18b is a shaft member which is provided parallel with the optical axis O, and rotates by rotational output power of the above described drive motor 18a.

Further, the base metal part 18g which rotatably supports a distal end portion of the above described lead screw 18b is placed at the drive motor 18a. The base metal part 18g is a member which is formed by, for example, a metal member in a thin plate shape being subjected to bending, and configures a basic region of the focusing mechanism 18. The base metal part 18g is fixed by, for example, a screw 18x and the like, on the outer circumferential face of the fixed frame 16 in a state in which the base metal part 18g is mounted to the above described drive motor 18a.

The focus nut 18e is screwed onto the above described lead screw 18b. The focus nut 18e is formed by having a spur gear on an outer circumferential face, and having a female screw in a center hole. The female screw is screwed onto the above described lead screw 18b. Further, the spur gear portion is meshed with the long gear 18c which will be described later. A nut abutment portion 14f of the group 4 frame unit 14 abuts on the focus nut 18e as shown in FIG. 6 and the like.

Here, as described above, the group 4 frame unit 14 is always pulled in the direction to the fixed lid 17 by the urging force of the urging member 19. Accordingly, the nut abutment portion 14f is always kept in a state in which the nut abutment portion 14f abuts on the focus nut 18e.

More specifically, the focus nut 18e (nut member) and the group 4 frame unit 14 (first frame) are kept to abut on each other by the urging member 19 (spring means).

The focus nut 18e is a nut member which moves in the direction parallel with the optical axis O while remaining to be non-rotational, with the above described group 4 frame unit 14 (first frame means) with respect to the long gear 18c which will be described later, with rotation of the lead screw 18b when only the lead screw 18b rotates. Further, when the long gear 18c which will be described later rotates, the focus nut 18e is rotated with the rotation thereof and moves in the optical axis direction on the lead screw 18b with the above described group 4 frame unit 14 (first frame means).

Meanwhile, at the base metal part 18g, both ends of the long gear support shaft 18d are pivotally supported in parallel with the above described lead screw 18b. The long gear support shaft 18d is rotatably fitted in, is inserted through and pivotally supports the long gear 18c.

The long gear 18c is a member having an long axis in the optical axis direction and has a gear portion on the outer circumferential face, and the gear portion is set so as to have a length necessary for the above described focus nut 18e (nut member) and the above described group 4 frame unit 14 (first frame means) to move in the direction of the optical axis O. Further, the long gear 18c is rotatably disposed parallel with the optical axis O. The long gear 18c is a guide spur gear which is configured to guide the focus nut 18e in the optical axis O direction, while keeping the non-rotating state of the focus nut 18e by receiving non-rotating state of the distance ring 33 by the action of the distance ring spring 35 as will be described later, when the lead screw 18b rotates.

The long gear 18c is meshed with the outer circumferential spur gear portion of the above described focus nut 18e. Further, the roller member 18*f* is integrally placed at one end side (side near to the drive motor 18*a* in the present embodiment) of the long gear 18*c*. Here, one end of the long gear 18*c* is formed into a convex shape of an oval shape or a D cut shape as shown in FIG. 5 and the like. In response thereto, the center hole of the roller member 18*f* is also formed into an oval shape or a D cut shape. Accordingly, the hole of the roller member 18*f* formed in the same shape is fitted onto the convex portion of the long gear 18*c*, whereby the long gear 18*c* and the roller member 18*f* are integrally formed and integrally rotatable. Accordingly, the roller member 18*f* may be said as the first rotational member.

A diameter of the roller member 18*f* is set to be a slightly larger than the diameter of the long gear 18*c*. An outer circumferential surface of the roller member 18*f* abuts on an inner circumferential face 33*f* (see FIG. 7) of the above described distance ring 33. Accordingly, when the distance ring 33 rotates around the optical axis O by receiving external power (for example, operation by a user), the rotational force of the distance ring 33 is frictionally transmitted to the roller member 18*f*. Thereby, the long gear 18*c* is configured to also rotate integrally with the roller member 18*f*.

As above, the above described roller member 18*f* functions as transmitting means which transmits the rotational force by the manual operation of the distance ring 33 (second frame means) to the long gear 18*c* (guide spur gear). More specifically, the roller member 18*f* is interposed between the distance ring 33 and the long gear 18*c*.

More specifically, the above described transmitting means is configured by the above described distance ring 33 (inner circumferential face of the second frame means), and the roller member 18*f* that is a rolling member which is provided integrally with the above described long gear 18*c* (guide spur gear) and rolls while abutting on an inner periphery of the distance ring 33 when the above described distance ring 33 (second frame means) rotates.

In the roller member 18*f* which is the rolling member, at least a surface which rolls and abuts on the distance ring 33 (second frame means) is configured by a member of a material which has elasticity, with a large frictional force, for example, a rubber material or the like.

Meanwhile, as described above, the distance index plate 20 is fixed to and disposed on the guide portion 14*c* of the group 4 frame unit 14 by a screw 20*x*. Here, an engaging member 20*b* which configures a part of fourth group frame position detecting means, and engages with a detection portion (input moving portion) 16*cc* of the above described linear encoder 16*c* is integrally mounted to the distance index plate 20 (see FIGS. 12 and 13). The engaging member 20*b* is a member which is formed by having a notch at a distal end, and is fixed to the guide portion 14*c* of the group 4 frame unit 14 together with the distance index plate 20 by the above described screw 20*x*. The detection portion 16*cc* of the linear encoder 16*c* is engaged in a notch portion of the engaging member 20*b*. Accordingly, when the group 4 frame unit 14 moves in the direction along the optical axis O and the distance index plate 20 moves in the direction along the optical axis O, the engaging member 20*b* also moves together in the direction along the optical axis O. Thereupon, the engaging member 20*b* acts on the detection portion 16*cc* of the linear encoder 16*c*. A detection output signal of the linear encoder 16*c* is transmitted to a control circuit including a CPU and the like mounted on a lens substrate not illustrated. Thereby, the positional detection of the group 4 frame unit 14 is performed.

An operation at the time of a focusing operation being performed in the lens barrel 1 of the above described first embodiment which is configured as above will be described hereinafter.

First, an operation at the time of an automatic focusing operation will be described. When a user performs a predetermined operation on a camera (not illustrated) side mounted with the lens barrel 1, for example, a first release operation or the like, the camera starts execution of the automatic focusing operation, in cooperation with the lens barrel 1 of the present embodiment.

In this case, when the drive motor 18*a* is driven, the lead screw 18*b* rotates. At this time, the focus nut 18*e* is connected to the distance ring 33 via the long gear 18*c* and the roller member 18*f*, but a frictional force occurs between the distance ring 33 and the roller member 18*f*, and therefore, the distance ring 33 is in a non-rotational state. Accordingly, the focus nut 18*e* does not rotate even when the above described lead screw 18*b* rotates, and is in a so-called rotation-restricted state.

As above, the focus nut 18*e* does not rotate, and therefore, when the drive motor 18*a* is driven and the lead screw 18*b* rotates, the focus nut 18*e* which is screwed on the lead screw 18*b* does not rotate. Therefore, the focus nut 18*e* which is screwed on the lead screw 18*b* moves to advance and retract in the direction along the optical axis O. At this time, the nut abutment portion 14*f* of the group 4 frame unit 14 is in a state in which the abutment portion 14*f* always abuts on the focus nut 18*e*. Accordingly, with advancing and retracting movement of the focus nut 18*e* in the optical axis O direction, the group 4 frame unit 14 also moves to advance and retract in the optical axis O direction. The moving amount at this time is detected by the linear encoder 16*c*. The control circuit (not illustrated) performs movement control of the group 4 frame unit 14 based on the detection output of the linear encoder 16*c*.

Next, an operation at a time of a manual focusing operation will be described. A user rotates the distance ring 33 around the optical axis O by a manual operation, whereby the manual focusing operation is started. When the distance ring 33 rotates, the roller member 18*f* rotates by the friction of the distance ring inner periphery and the roller member 18*f*, with which, the long gear 18*c* also rotates, and the focus nut 18*e* rotates. At this time, the lead screw 18*b* is in a non-rotational state by detent torque of the drive motor 18*a*. Accordingly, the focus nut 18*e* moves to advance and retract in the direction along the optical axis O while rotating around the screw of the lead screw 18*b* which is non-rotational by following the rotation of the long gear 18*c*. Thereby, the group 4 frame unit 14 also moves to advance and retract in the direction along the optical axis O.

As above, the user rotates the distance ring 33 by the manual operation, whereby the focus nut 18*e* moves in the optical axis O direction, and therefore, from the state in which the user can perform the automatic focusing operation, the user can directly perform the manual focusing operation without especially performing a switching operation of the mechanism. It is assumed that in the case of performing a manual focusing operation, the user is to further perform a rotational operation of the distance ring 33 in the same direction when the focus nut 18*e* reaches one end portion within the movable range thereof. At this time, if the focus nut 18*e* is to continue rotation in response to the rotation operation of the distance ring 33, damage or the like is likely to occur, due to an overload being exerted on the meshed portion of the outer circumferential spur gear portion of the focus nut 18*e* and the long gear 18*c*.

However, the focusing mechanism 18 in the lens barrel 1 of the present embodiment is configured to perform transmission of the drive force with the roller member 18f interposed between the distance ring 33 and the long gear 18c. Accordingly, the configuration is such that when an overload occurs between the long gear 18c and the focus nut 18e under the situation as described above, a slip occurs between the distance ring 33 and the roller member 18f. Accordingly, transmission of the drive force to the long gear 18c after the roller member 18f is cut off, whereby the overload is configured not to be applied to the component members (in particular, the focus nut 18e) of the focusing mechanism 18A and the group 4 frame unit 14.

More specifically, when the distance ring 33 is rotationally operated, if an overload occurs to the focus nut 18e which is meshed with the long gear 18c, a slip occurs between the inner circumferential face of the distance ring 33 and the roller member 18f. Thereby, the above described transmission means (the inner circumferential face of the distance ring 33 and the roller member 180 functions as slip clutch means interposed between the above described distance ring 33 (second frame means) and the above described focus nut 18e (nut member).

As described above, according to the above described first embodiment, the configuration is such that at the time of the automatic focusing operation by the drive motor 18a, rotation restriction of the focus nut 18e which is screwed onto the lead screw 18b is performed, and the focus nut 18e is moved to advance and retract, while at the time of the manual focusing operation by the distance ring 33, the drive force in the rotational direction of the distance ring 33 is mechanically transmitted to the focus nut 18e to rotate the focus nut 18e which is screwed onto the lead screw 18b which is restricted from rotating, and moves the focus nut 18e to advance and retract.

Consequently, according to the configuration like this, from the state in which the automatic focusing operation can be performed, the manual focusing operation can be instantly performed by the distance ring 33 being rotationally operated without the switching operation of the mechanism being especially performed.

Second Embodiment

Figure 15:
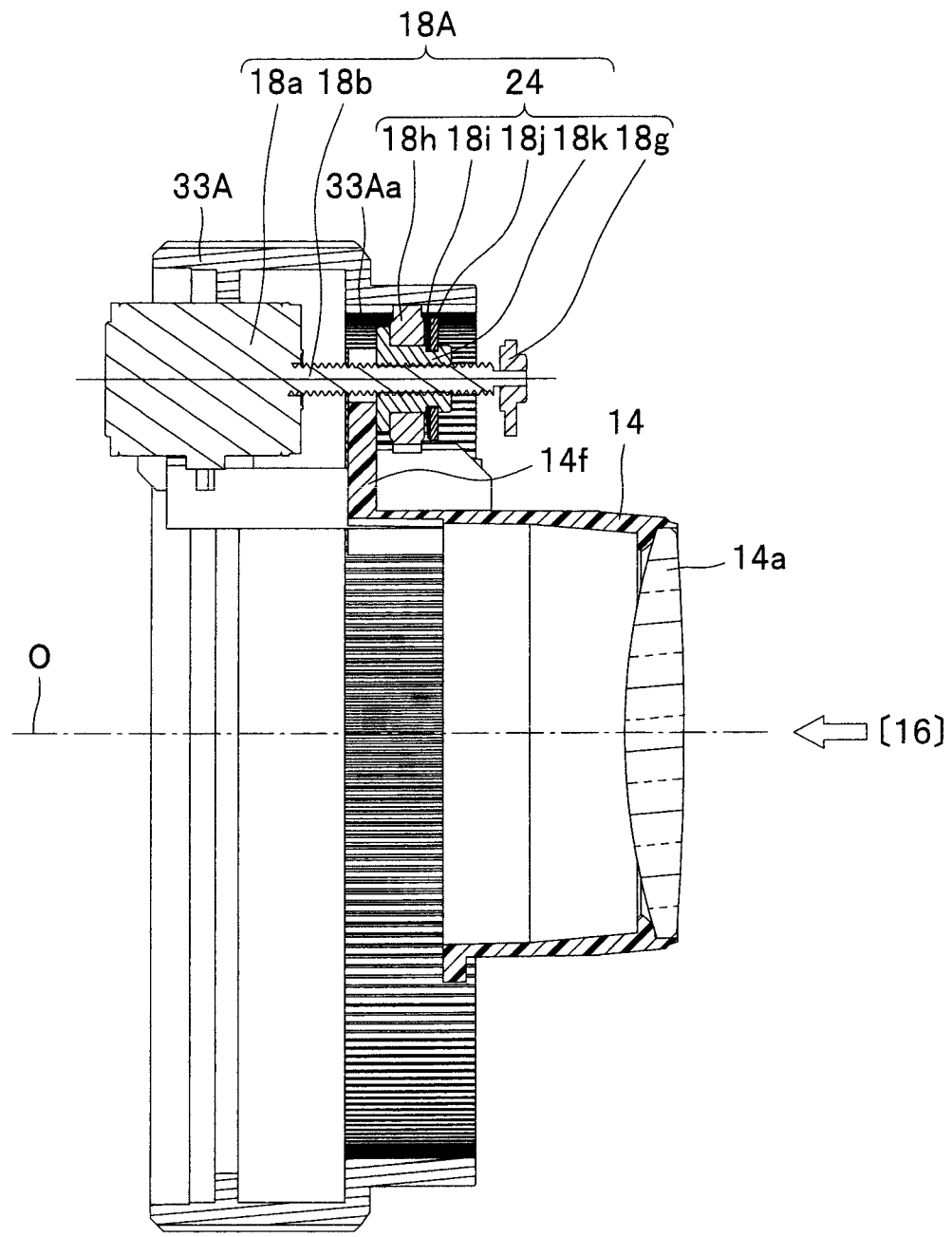
FIG. 15 is a sectional view of a state in which only the component members relating to the focusing mechanism of FIG. 14 are assembled, and is a sectional view taken along the line [15]-[15] of FIG. 16.
Figure 16:
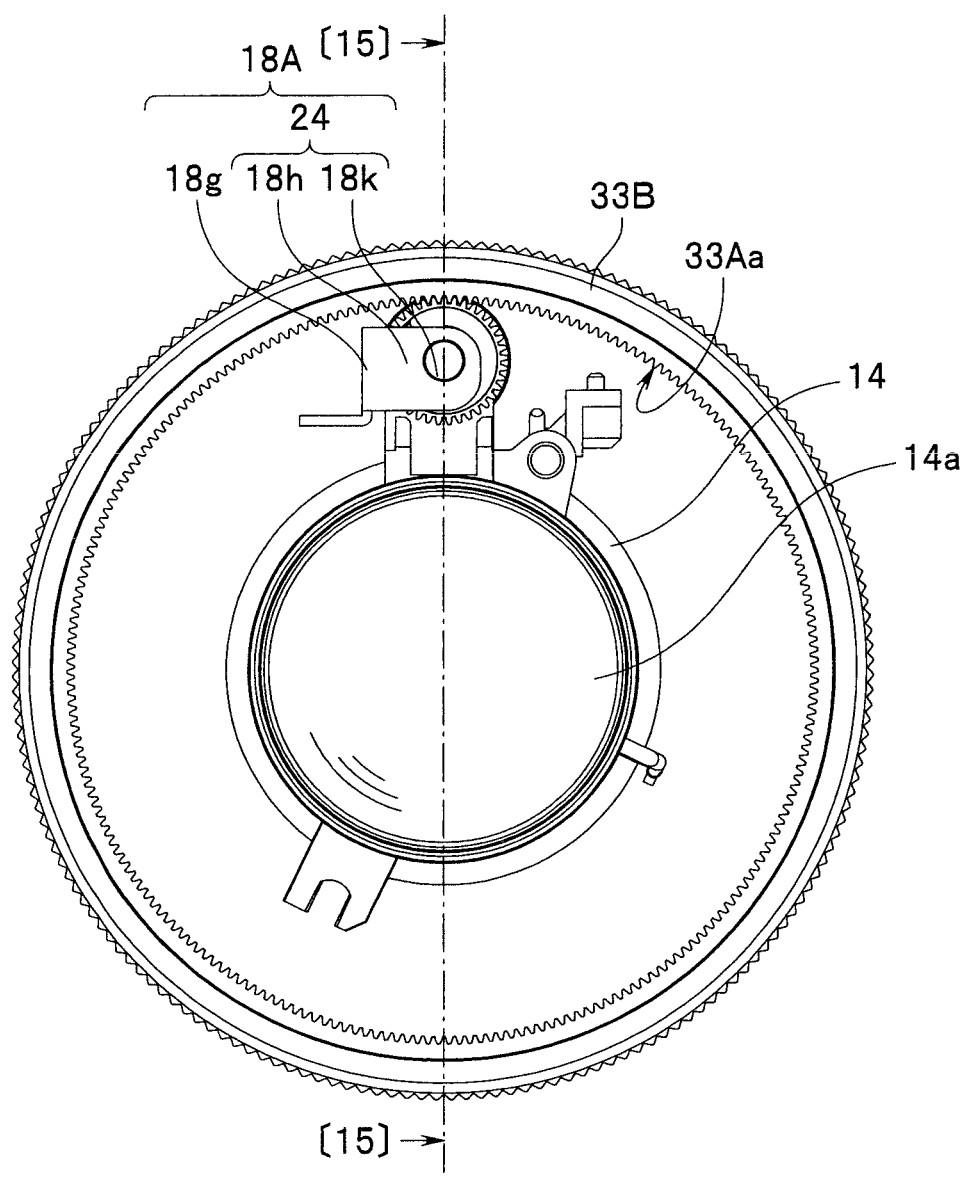
FIG. 16 is a plan view seen from the arrow [16] direction of FIG. 15.

Next, a lens barrel of a second embodiment of the present invention will be described hereinafter with use of FIGS. 14 to 16. A configuration of the present embodiment is basically substantially the same configuration as the aforementioned first embodiment, and differs from the first embodiment only in the configuration of the focusing mechanism. Accordingly, the same reference signs are used for the same component members as those of the aforementioned first embodiment, and in the following description, only the region with the configuration different from the configuration of the aforementioned first embodiment will be described in detail.

Figure 14:
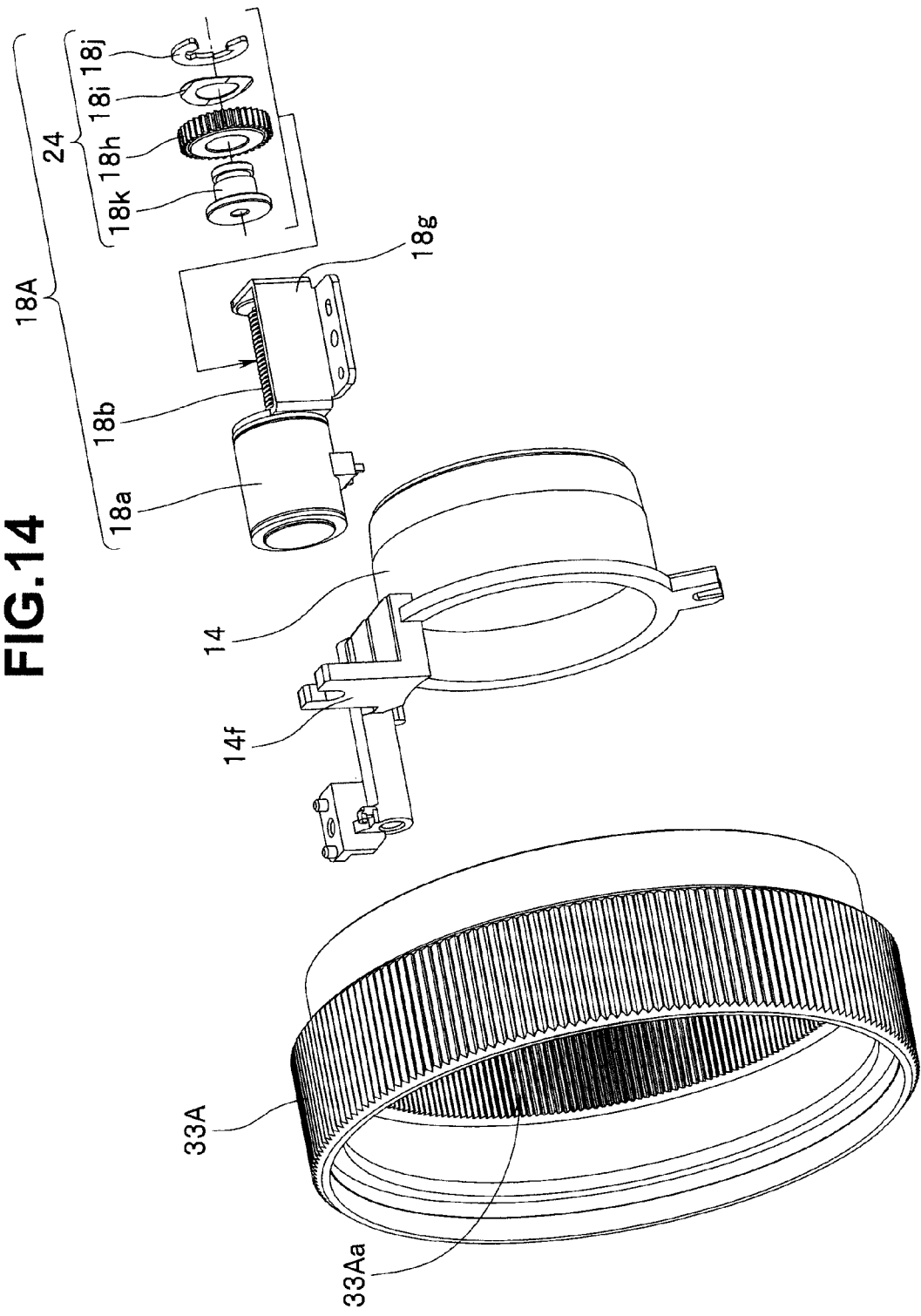
FIG. 14 is an essential part enlarged exploded perspective view showing component members relating to a focusing mechanism in a lens barrel of a second embodiment of the present invention by extracting the component members.

FIG. 14 is an essential part enlarged and exploded perspective view showing component members relating to a focusing mechanism in the lens barrel of the second embodiment of the present invention by extracting the component members. FIG. 15 is a sectional view of a state in which only the component members relating to the focusing mechanism of FIG. 14 are assembled, and is a sectional view taken along the [15]-[15] line of FIG. 16. FIG. 16 is a plan view seen from the arrow [16] direction of FIG. 15.

A focusing mechanism 18A of the present embodiment is provided at the fixed frame 16 which is a fixed member, and is mainly configured by the drive motor 18a which is a rotational drive source, the lead screw 18b which is a male-screw-shaped member, the base metal part 18g, an outer circumferential gear 18h which is a first rotational member, a ring spring 18i, an E-ring 18j, a nut 18k which is a second rotational member and the like. In the present embodiment, the drive motor 18a, the lead screw 18b, the base metal part 18g and the like are formed in the same shapes as in the aforementioned first embodiment.

In the present embodiment, a configuration is such that a nut portion set 24 is provided in place of the focus nut in the aforementioned first embodiment, and the long gear 18c and the long gear support shaft 18d are eliminated.

The nut portion set 24 is configured by having the nut 18k having a female screw which is screwed onto the lead screw 18b in a center hole, the outer circumferential gear 18h having a spur gear on an outer circumferential face, a ring spring 18i which has a shaft portion of the above described nut 18k inserted therethrough, and is in a form of a plate spring member in a thin plate shape being formed into a circular ring shape, and the E-ring 18j which is fitted in an circumferential groove portion of the above described nut 18k to be a stopper for the above described ring spring 18i.

After the shaft portion of the nut 18k is fitted in a center hole of the outer circumferential gear 18h, the shaft portion of the nut 18k is disposed by being inserted through the ring spring 18i, and in this state, the E-ring 18j is locked at the circumferential groove portion of the shaft portion of the nut 18k. In this case, the ring spring 18i is in a state in which the ring spring 18i is tightly held by pressure contact between one end surface of the outer circumferential gear 18h and an opposed surface of the E-ring 18j. Accordingly, the ring spring 18i presses the other end surface of the outer circumferential gear 18h in the direction parallel with the optical axis O toward a flange surface of the nut 18k. The shaft portion of the nut 18k is fitted in the center hole of the outer circumferential gear 18h to be integrated. Accordingly, when any one of the nut 18k and the outer circumferential gear 18h rotates, both of the nut 18k and the outer circumferential gear 18h are integrally rotated by fitting forces of both the nut 18k and the outer circumferential gear 18h and a pressing force of the ring spring 18i. Meanwhile, for example, when a predetermined rotational force amount or more, that is, a power of frictional torque which occurs by an urging force of the ring spring 18i or more is applied to the outer circumferential gear 18h, a slip is set to occur between the outer circumferential gear 18h and the nut 18k. In this case, only the outer circumferential gear 18h rotates as a separate body.

The female screw of the above described nut portion set 24 is screwed onto the lead screw 18b. In this state, the outer circumferential gear 18h is meshed with an internally-threaded gear (internal gear) 33Aa which is formed on an inner circumferential face of the distance ring 33A. Here, the internally-threaded gear 33Aa is transmission means which transmits a rotational force by a manual operation of the distance ring 33A (second frame means) to the group 4 frame unit 14 via the nut portion set 24.

More specifically, the transmission means includes the internally-threaded gear 33Aa (internal gear) which is provided on an inner periphery of the above described distance ring 33A (second frame means) and is meshed with the outer circumferential gear 18h (spur gear) of the above described nut portion set 24, and is configured to rotate the above described outer circumferential gear 18h (spur gear) when the above described distance ring 33A (second frame means) rotates. The other configurations are the same as in the aforementioned first embodiment.

An operation in the lens barrel of the above described second embodiment which is configured as above will be briefly described hereinafter.

First, at the time of an automatic focusing operation, when the user performs a first release operation or the like, the drive motor 18a is driven, and the lead screw 18b rotates At this time, the outer circumferential gear 18h of the nut portion set 24 is meshed with the internally-threaded gear 33Aa of the distance ring 33A, and the distance ring 33 is in a non-rotational state by the above described operation of the distance ring spring 35. Accordingly, even when the above described lead screw 18b rotates, the nut portion set 24 does not rotate, and the nut portion set 24 is in a so-called rotation restricted state. When the drive motor 18a is driven and the lead screw 18b rotates in this state, the nut 18k moves to advance and retract in the direction along the optical axis O, and by being linked with this, the group 4 frame unit 14 also moves to advance and retract in the direction along the optical axis O.

Next, at the time of a manual focusing operation, the user rotates the distance ring 33A around the optical axis O against the frictional force by the urging force of the distance ring spring 35. When the distance ring 33 rotates, the nut portion set 24 rotates via the outer circumferential gear 18h which is meshed with the internally-threaded gear 33Aa At this time, the lead screw 18b is in a non-rotational state by detent torque of the drive motor 18a. Accordingly, the nut portion set 24 moves to advance and retract in the direction along the optical axis O while rotating. Thereby, the group 4 frame unit 14 also moves to advance and retract in the direction along the optical axis O.

It is assumed that after the nut portion set 24 reaches one end portion of the movable range at the time of the manual focusing operation, and the distance ring 33A is further rotationally operated in the same direction. At this time, even if the nut portion set 24 is to continue rotation in response to the rotational operation of the distance ring 33A, a slip occurs between the outer circumferential gear 18h and the nut 18k. Thereby, the outer circumferential gear 18h turns free, and an overload is restrained from being applied to the component members of the focusing mechanism 18A.

In the focusing mechanism 18A in the lens barrel of the present embodiment, the nut portion set 24 for advancing and retracting the group 4 frame unit 14 in the optical axis O direction is configured by the two members that are the outer circumferential gear 18h and the nut 18k, and is configured to perform transmission of the drive force between the outer circumferential gear 18h and the nut 18k by the urging force of the ring spring 18i. By the configuration like this, an overload is restrained from being applied to the focusing mechanism 18A and the group 4 frame unit 14 which is the first frame means, as in the aforementioned first embodiment.

Accordingly, the ring spring 18i (spring member) brings the outer circumferential gear 18h (spur gear) of the above described nut portion set 24 and the nut 18k of the above described nut portion set 24 into pressure contact with each other in the direction parallel with the optical axis O. At the same time as this, when an overload occurs to the nut portion set 24, the ring spring 18i functions as slip clutch means.

As described above, according to the above described second embodiment, substantially the same effect can be obtained, though the second embodiment has the configuration which is slightly simplified in contrast with the aforementioned first embodiment.

The above described first and second embodiments can be said as "including a rotational drive source, a male-screw-shaped member (lead screw) that is provided parallel with an optical axis, and rotates by rotation of the drive source, first frame means (lens frame) that moves in an optical axis direction, second frame means (distance ring) that rotates by receiving a manual operation, a first rotational member (guide spur gear) that rotates by receiving the rotation of the second frame means, and a second rotational member (nut) that is screwed onto the male-screw-shaped member, wherein by including the configuration, when the second frame means is rotated, the second rotational member rotates on the male-screw-shaped member by being linked with the rotation of the first rotational member, and moves on the male-screw-shaped member to press the first frame means in the optical axis direction. When the male-screw-shaped member rotates by the rotation of the rotational drive source, the second rotational member moves on the male-screw-shaped member to press the first frame means in the optical axis direction."

Third Embodiment

Figure 18:
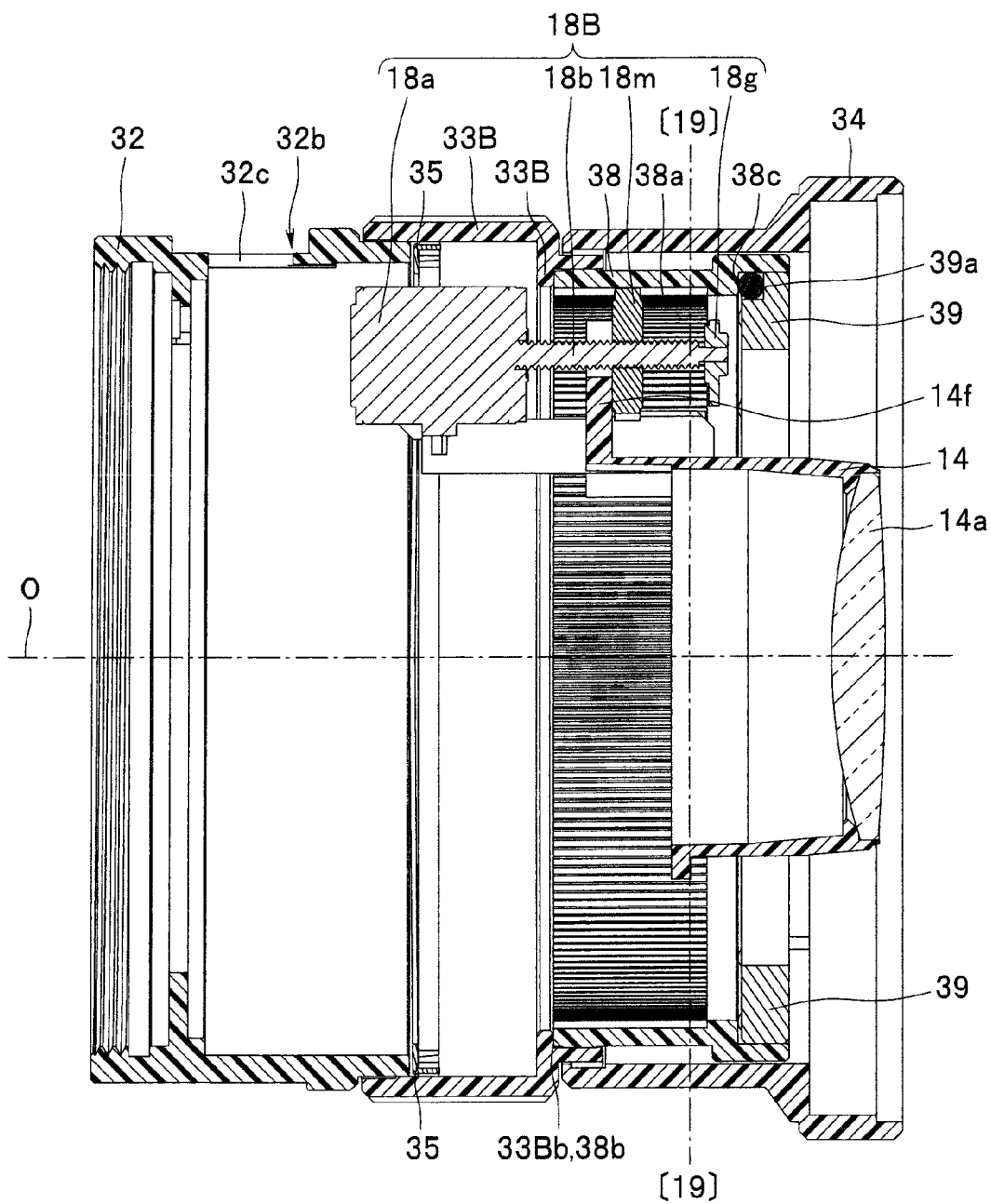
FIG. 18 is a sectional view of a state in which the component members relating to the focusing mechanism and the exterior components of FIG. 17 are assembled, and is a sectional view taken along the line [18]-[18] of FIG. 19.
Figure 19:
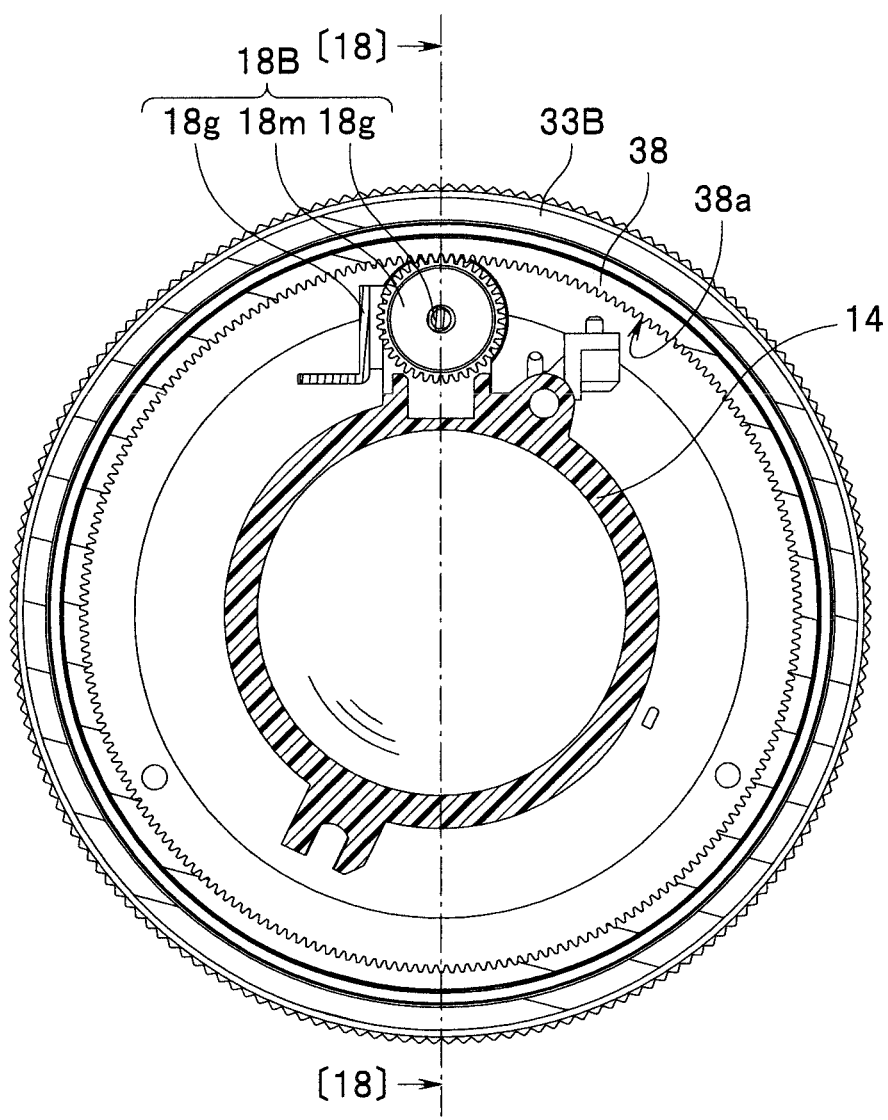
FIG. 19 is a sectional view taken along the line [19]-[19] of FIG. 18.

Next, a lens barrel of a third embodiment of the present invention will be described hereinafter with use of FIGS. 17 to 19. A configuration of the present embodiment is basically substantially the same configuration as the aforementioned first and second embodiments, and differs from the first and second embodiments only in the configuration of the focusing mechanism. Accordingly, the same reference signs are used for the same component members as those of the aforementioned first and second embodiments, and in the following description, only the region with the configuration different from the configurations of the aforementioned first and second embodiments will be described in detail.

Figure 17:
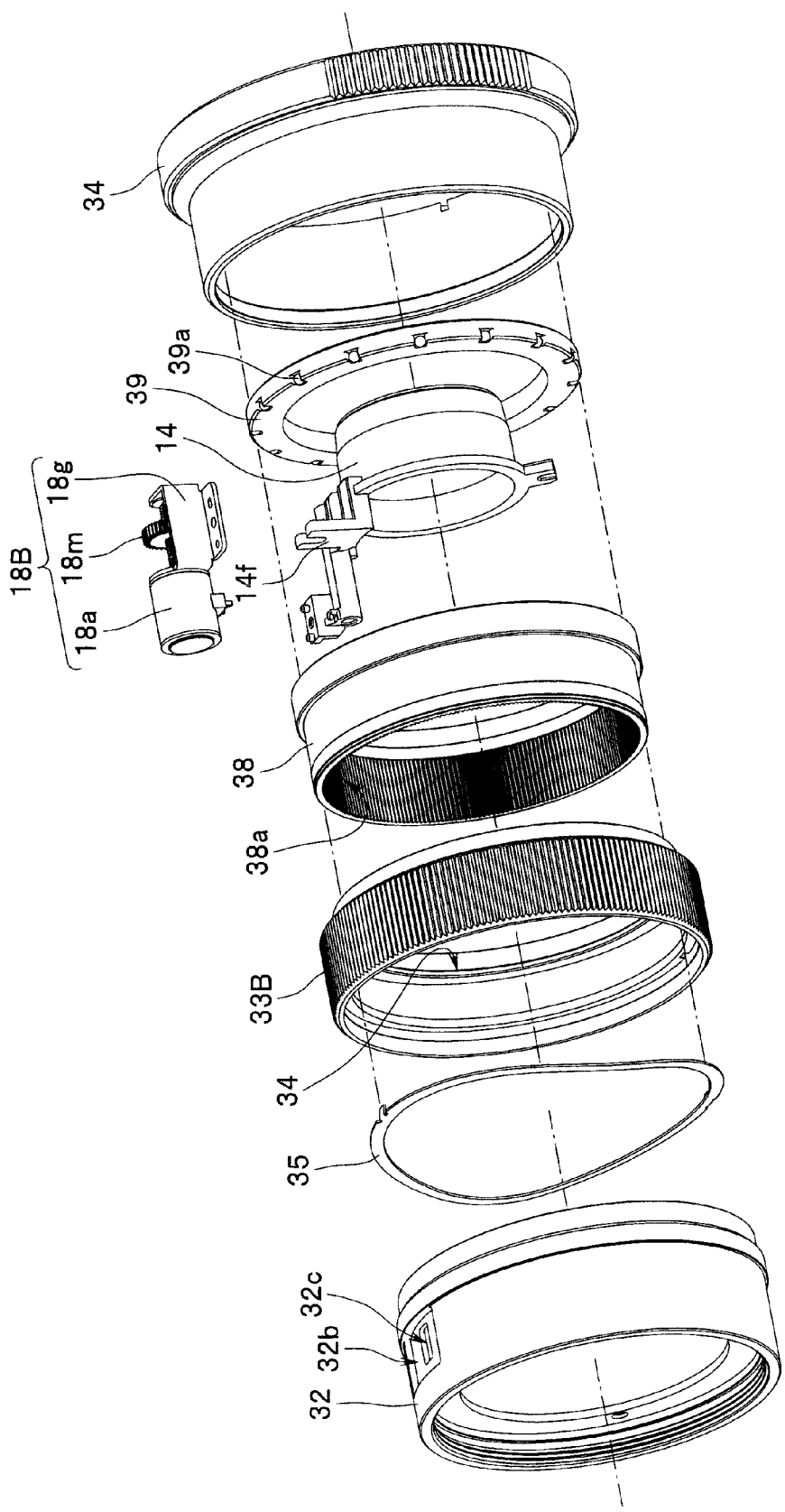
FIG. 17 is an essential part enlarged exploded perspective view showing component members relating to a focusing mechanism and exterior components in a lens barrel of a third embodiment of the present invention by extracting the component members and the exterior components.

FIG. 17 is an essential part enlarged and exploded perspective view showing only component members and exterior components relating to and necessary for a focusing mechanism in the lens barrel of the third embodiment of the present invention. FIG. 18 is a sectional view of a state in which the component members and the exterior components relating to the focusing mechanism of FIG. 17 are assembled, and is a sectional view taken along the [18]-[18] line of FIG. 19. FIG. 19 is a sectional view taken along the line [19]-[19] of FIG. 18.

In the lens barrel of the present embodiment, the distance ring spring 35 is provided between the filter ring 32 which is the exterior component, and a distance ring 33B which rotates relatively with the filter ring 32, and the configuration that the distance ring spring 35 presses the distance ring 33B to a rear side is the same as in the aforementioned first and second embodiments.

The present embodiment differs from the first and second embodiments in the configuration that an internally-threaded gear ring 38 is placed in an inner region of the rear cover 34 at a rear side of the above described distance ring 33B. The internally-threaded gear ring 38 is a ring-shaped member having an internally-threaded gear 38a on an inner circumferential face.

Second frame means in the present embodiment is configured by a ring-shaped member of two pieces which are the distance ring 33B that is a first rotational ring which is manually rotated, and the internally-threaded gear ring 38 that is a second rotational ring which has the internally-threaded gear 38a that is meshed with a nut gear 18m (nut member; will be described later) on the inner circumferential face, and rotates with the above described distance ring 33B. The above described distance ring 33B (first rotational ring) and the internally-threaded gear ring 38 (second rotational ring) are configured to be urged in the optical axis O direction by the distance ring spring 35 (spring member) and to be integrally connected by a frictional force.

A front end surface 38b of the internally-threaded gear ring 38 abuts on an inward flange portion 33Bb which is formed in a vicinity of a rear end edge on an inner circumferential side of the above described distance ring 33B. As described above, the above described distance ring 33B is pressed to the rear side by the urging force of the above described distance ring spring 35, and therefore, the internally-threaded gear ring 38 is also pressed in the rear side direction via the distance ring 33B.

Meanwhile, a rear end edge of the internally-threaded gear ring 38 abuts on a ball ring 39 provided in a vicinity of a rear end edge portion on an inner circumferential side of a fixed frame (not illustrated). Thereby, the ball ring 39 receives pressure to the rear side of the above described internally-threaded gear ring 38 by the above described distance ring spring 35.

The above described ball ring 39 is formed from a member in a circular ring shape, and a plurality of ball members 39a are placed equidistantly in a circumferential direction, on an abutment surface side onto the above described internally-threaded gear ring 38. The plurality of ball members 39a abut on a thrust surface 38c which is provided in a vicinity of a rear end edge of an inner periphery of the above described internally-threaded gear ring 38, and thereby functions as ball bearings for smoothly rotating the internally-threaded gear ring 38.

The above described internally-threaded gear ring 38 is transmission means which transmits the rotational force by the manual operation of the distance ring 33B (second frame means) to the group 4 frame unit 14 via the nut gear 18m.

Meanwhile, the focusing mechanism 18B in the present embodiment is mainly configured by the drive motor 18a, the lead screw 18b, the base metal part 18g, the nut gear 18m which is a rotational member and the like. Among the above components, the drive motor 18a, the lead screw 18b and the base metal part 18g are formed in the same shapes as in the aforementioned first embodiment. Of the above described focusing mechanism 18B, the nut gear 18m is a nut member having a female screw which is screwed onto the lead screw 18b in the center shaft hole, and having a spur gear portion which is meshed with the internally-threaded gear ring 38 on the outer circumferential face. The other configurations are substantially the same as in the aforementioned first and second embodiments.

An operation in the lens barrel of the above described third embodiment configured as above will be briefly described hereinafter.

First, at a time of an automatic focusing operation, the drive motor 18a is driven, and the lead screw 18b rotates. At this time, the spur gear portion of the nut gear 18m and the internally-threaded gear 38a of the internally-threaded gear ring 38 are in the state meshed with each other, and the distance ring 33B is in a non-rotational state by the frictional force of the distance ring spring 35. Accordingly, even if the above described lead screw 18b is rotated, the nut gear 18m does not rotate, and is in a so-called rotation restricted state. More specifically, when the distance ring 33B is in a non-rotational state, the nut gear 18m keeps a non-rotational state.

When the drive motor 18a is driven and the lead screw 18b rotates in this state, the nut gear 18m is moved to advance and retract in the optical axis O direction by the action of the lead screw 18b and the female screw of the nut gear 18m while keeping the non-rotational state. Thereby, the nut abutment portion 14f is pressed, and the group 4 frame unit 4 which is the first frame means is also moved to advance and retract in the optical axis O direction.

Next, at the time of a manual focusing operation, the distance ring 33B is manually operated in the rotational direction around the optical axis O by the user. Thereupon, the internally-threaded gear ring 38 which is sandwiched by the distance ring 33B and the ball ring 39 smoothly rotates integrally with the above described distance ring 33B. At this time, the lead screw 18b is in a non-rotational state by the detent torque of the drive motor 18a Accordingly, the nut gear 18m moves to advance and retract in the direction along the optical axis O by the action of the lead screw 18b and the female screw of the nut gear 18m, while the nut gear 18m is rotating. Thereby, the nut abutment portion 14f is pressed, and the group 4 frame unit 14 which is the first frame means also moves to advance and retract in the direction along the optical axis O.

It is assumed that at the manual focusing operation, the nut gear 18m reaches one end portion of the movable range, and thereafter, the distance ring 33B is further rotationally operated in the same rotational direction. At this time, if the nut gear 18m is to continue rotation in response to the rotational operation of the distance ring 33B, a slip occurs between the distance ring 33B and the internally-threaded gear ring 38, that is, the flange portion 33Bb of the distance ring 33B and the front end surface 38b of the internally-threaded gear ring 38. Thereby, even when the distance ring 33B is rotationally operated, the internally-threaded gear ring 38 is brought into a non-rotational state, whereby an overload is restrained from being applied to the component members of the focusing mechanism 18B.

Further, the third embodiment can be said as "including a rotational drive source, a male-screw-shaped member (lead screw) that is provided parallel with an optical axis, and rotates by rotation of the drive source, first frame means (lens frame) that moves in an optical axis direction, second frame means (distance ring) that rotates (around the optical axis) by receiving a manual operation, and a rotational member (nut) that is screwed onto the male-screw-shaped member, wherein when the rotational member rotates by receiving the rotation of the second frame means, the rotational member rotates on the male-screw-shaped member by being linked with the rotation of the second frame means, and moves on the male-screw-shaped member to press the first frame means in the optical axis direction. When the male-screw-shaped member rotates by the rotation of the rotational drive source, the rotational member moves on the male-screw-shaped member to press the first frame means in the optical axis direction".

Furthermore, the present invention can be generally said as "including a male-screw-shaped member (lead screw) that is provided parallel with an optical axis, first frame means (lens frame) that moves in an optical axis direction, second frame means (distance ring) that rotates (around the optical axis) by receiving a manual operation, and a rotational member (nut) that is screwed onto the male-screw-shaped member, wherein when the rotational member rotates by receiving the rotation of the second frame means, the rotational member rotates on the male-screw-shaped member by being linked with the rotation of the second frame means, and moves on the male-screw-shaped member to press the first frame means in the optical axis direction. When the male-screw-shaped member rotates, the rotational member moves on the male-screw-shaped member to press the first frame means in the optical axis direction".

As described above, according to the above described third embodiment, substantially the same effect as in the aforementioned first and second embodiments can be obtained.

In each of the above described embodiments, the group 4 frame unit 14 as the first frame means which is configured to be capable of being freely advancing and retracting in the direction along the optical axis O is the frame member which holds the lens for focusing, and moves to advance and retract for the purpose of focusing. However, the configuration of the present invention is not limited to the configuration and use purpose, and for example, the group 4 frame unit 14 can be totally similarly applied to the frame member which holds, for example, a variable-power lens and moves to advance and retract in the optical axis O direction for the purpose of zooming.

The present invention is not limited to the embodiments described above, and various modifications and applications can be carried out within the range without departing from the gist of the invention as a matter of course. Further, the above described embodiments include the inventions at various stages, and various inventions can be extracted by arbitrary combination of a plurality of constituent features which are disclosed. For example, even if several constituent features are deleted from all the constituent features shown in the above described respective embodiments, the configuration from which the constituent features are deleted can be extracted as the invention when the invention can solve the problem to be solved, and the effect of the invention can be obtained. The invention is not limited by a specific embodiment except that the invention is limited by the accompanying claims.

What is claimed is:

1. A lens barrel, comprising
a rotational drive source,
a male-screw-shaped member that is provided parallel with an optical axis,
and rotates by rotation of the drive source;
first frame means that moves in an optical axis direction;
second frame means that rotates by receiving a manual operation;
a first rotational member that rotates by receiving the rotation of the second frame means; and
a second rotational member that is screwed onto the male-screw-shaped member,
wherein when the second frame means is rotated, the second rotational member rotates on the male-screw-shaped member by being linked with the rotation of the first rotational member, and moves on the male-screw-shaped member to press the first frame means in the optical axis direction, and
when the male-screw-shaped member rotates by the rotation of the rotational drive source, the second rotational member moves on the male-screw-shaped member to press the first frame means in the optical axis direction.

2. The lens barrel according to claim 1,
wherein the first rotational member includes a rolling member that is provided between an inner periphery of the second frame means and the second rotational member, rolls on the inner periphery of the second frame means when the second frame means rotates, and rotates with the first rotational member.

3. The lens barrel according to claim 1,
wherein an internal gear is provided on the inner periphery of the second frame means, a gear portion that is meshed with the internal gear is provided on an outer periphery of the first rotational member, and when the second frame means is rotated, the second rotational member is rotated via the first rotational member.

4. The lens barrel according to claim 1,
wherein the first frame means holds a lens for focusing.

5. The lens barrel according to claim 1,
wherein the first frame means holds a lens for zooming.

6. The lens barrel according to claim 1,
wherein the second frame means has an internal gear on an inner periphery, and the first rotational member is a gear which is meshed with the internal gear, and has the second rotational member, which is meshed with the male-screw-shaped member, in a center of the first rotational member.

7. The lens barrel according to claim 6, further comprising:
a spring member for bringing the first rotational member and the second rotational member into pressure contact with each other in the optical axis direction.

8. The lens barrel according to claim 2,
wherein the rolling member has a surface which rolls and abuts on the inner periphery of the second frame means and which is made of a rubber material.

9. A lens barrel, comprising:
a male-screw-shaped member that is provided parallel with an optical axis;
first frame means that moves in an optical axis direction;
second frame means that rotates by receiving a manual operation; and
a rotational member that is screwed onto the male-screw-shaped member,
wherein when the rotational member rotates by receiving the rotation of the second frame means, the rotational member rotates on the male-screw-shaped member by being linked with the rotation of the second frame means, and moves on the male-screw-shaped member to press the first frame means in the optical axis direction, and when the male-screw-shaped member rotates, the rotational member moves on the male-screw-shaped member to press the first frame means in the optical axis direction.

10. A lens barrel, comprising:
a rotational drive source;
a male-screw-shaped member that is provided parallel with an optical axis,
and rotates by rotation of the drive source;
first frame means that moves in an optical axis direction;
second frame means that rotates by receiving a manual operation; and
a rotational member that is screwed onto the male-screw-shaped member,
wherein when the rotational member rotates by receiving the rotation of the second frame means, the rotational member rotates on the male-screw-shaped member by being linked with the rotation of the second frame means, and moves on the male-screw-shaped member to press the first frame means in the optical axis direction, and
when the male-screw-shaped member rotates by the rotation of the rotational drive source, the rotational member moves on the male-screw-shaped member to press the first frame means in the optical axis direction.

11. The lens barrel according to claim 10,
wherein the rotational member is a spur gear.

12. The lens barrel according to claim 10,
wherein the second frame means is configured by a distance ring and an internal gear ring having an internal tooth, and integral connection is configured by friction by an urging force of a spring member provided between a fixed member and the second frame means.

13. The lens barrel according to claim 1,
wherein the second rotational member is rotatable around the male-screw-shaped member.

14. The lens barrel according to claim 9,
wherein the rotational member is rotatable around the male-screw-shaped member.

15. The lens barrel according to claim 10,
wherein the rotational member is rotatable around the male-screw-shaped member.

\* \* \* \* \*